United States Patent
Mitra et al.

(10) Patent No.: US 12,259,827 B2
(45) Date of Patent: Mar. 25, 2025

(54) SYSTEMS AND METHODS FOR ADDRESS SCRAMBLING

(71) Applicant: Avago Technologies International Sales Pte. Limited, Singapore (SG)

(72) Inventors: Bhaswar Mitra, Santa Clara, CA (US); Mark Birman, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 116 days.

(21) Appl. No.: 18/104,019

(22) Filed: Jan. 31, 2023

(65) Prior Publication Data

US 2024/0256467 A1 Aug. 1, 2024

(51) Int. Cl.
| | |
|---|---|
| G06F 12/00 | (2006.01) |
| G06F 12/02 | (2006.01) |
| G06F 12/14 | (2006.01) |
| G06F 13/00 | (2006.01) |

(52) U.S. Cl.
CPC ...... G06F 12/1408 (2013.01); G06F 12/0292 (2013.01)

(58) Field of Classification Search
CPC .......................... G06F 12/1408; G06F 12/0292
USPC .......................................................... 711/163
See application file for complete search history.

(56) References Cited

U.S. PATENT DOCUMENTS

| | | | | |
|---|---|---|---|---|
| 4,827,508 A | * | 5/1989 | Shear ...................... | G06Q 30/04 707/999.009 |
| 4,977,594 A | * | 12/1990 | Shear ...................... | G06Q 30/04 705/52 |
| 5,050,213 A | * | 9/1991 | Shear ...................... | G06Q 30/04 705/53 |
| 6,064,676 A | * | 5/2000 | Slattery ............ | H04N 21/23614 370/535 |
| 6,111,896 A | * | 8/2000 | Slattery ............ | H04N 21/23106 370/542 |
| 6,148,082 A | * | 11/2000 | Slattery ............ | H04N 21/23608 713/160 |
| 6,195,368 B1 | * | 2/2001 | Gratacap ............ | H04N 21/8547 370/542 |
| 6,246,701 B1 | * | 6/2001 | Slattery .............. | H04N 21/2389 375/E7.022 |

(Continued)

FOREIGN PATENT DOCUMENTS

JP 2005-189970 A 7/2005

OTHER PUBLICATIONS

European Search Report on non-Foley case related to U.S. Appl. No. 18/104,019 Dtd Jun. 25, 2024.

*Primary Examiner* — Sheng Jen Tsai
(74) *Attorney, Agent, or Firm* — FOLEY & LARDNER LLP

(57) ABSTRACT

A system including memory, a lookup circuit and an address circuit. The memory can store a plurality of tables. Each table can have a plurality of entries and each entry can have an entry index. The lookup circuit can be coupled with the memory. The lookup circuit can provide the plurality of entry indexes of the plurality of tables to the address circuit. The address circuit can include a first circuit, a second circuit, and third circuit. The first circuit can include a plurality of entry scramblers. The second circuit can include a plurality of translators, and the third circuit can include a plurality of row scramblers.

18 Claims, 17 Drawing Sheets

(56) References Cited

U.S. PATENT DOCUMENTS

| | | | | |
|---|---|---|---|---|
| 6,292,490 | B1* | 9/2001 | Gratacap | H04N 21/8547 370/535 |
| 6,351,471 | B1* | 2/2002 | Robinett | H04N 21/63345 375/240 |
| 6,351,474 | B1* | 2/2002 | Robinett | H04N 21/23424 370/468 |
| 9,355,271 | B2* | 5/2016 | Yavuz | G06F 21/6227 |
| 11,405,192 | B2* | 8/2022 | Zheng | G06F 16/90335 |
| 2008/0133935 | A1* | 6/2008 | Elovici | H04L 9/14 713/193 |
| 2008/0177636 | A1* | 7/2008 | Yoshida | G06Q 30/0615 705/26.42 |
| 2009/0106549 | A1* | 4/2009 | Mohamed | G06F 21/6218 713/156 |
| 2015/0143112 | A1* | 5/2015 | Yavuz | G06F 21/6227 713/165 |
| 2016/0111098 | A1* | 4/2016 | Samuelsson | G10L 19/038 |
| 2016/0286388 | A1* | 9/2016 | Marin | H04W 4/80 |
| 2017/0026350 | A1* | 1/2017 | Dawoud | H04L 63/067 |
| 2018/0144152 | A1* | 5/2018 | Greatwood | H04L 63/123 |
| 2019/0278939 | A1* | 9/2019 | Fan | H04L 9/3297 |
| 2019/0340381 | A1* | 11/2019 | Yavuz | G06F 21/606 |
| 2019/0394221 | A1* | 12/2019 | Xiao | H04W 12/128 |
| 2020/0403781 | A1* | 12/2020 | Gentry | G06F 21/6245 |
| 2021/0051001 | A1* | 2/2021 | Li | H04L 9/0869 |
| 2021/0074109 | A1* | 3/2021 | Depta | G07D 7/205 |
| 2021/0160098 | A1* | 5/2021 | Van Den Keybus | H04L 12/43 |
| 2021/0328762 | A1* | 10/2021 | Becher | H04L 63/0428 |
| 2021/0344477 | A1* | 11/2021 | Aharoni | H04L 9/008 |
| 2022/0057960 | A1* | 2/2022 | Boehm | G06F 3/0655 |
| 2023/0034289 | A1* | 2/2023 | Corvi | G06F 8/53 |
| 2023/0099668 | A1* | 3/2023 | Corvi | A63F 13/323 463/42 |
| 2023/0106435 | A1* | 4/2023 | Jiang | G06F 21/629 726/26 |
| 2023/0148424 | A1* | 5/2023 | Asgekar | G06K 1/121 715/224 |

* cited by examiner

SYSTEMS AND METHODS FOR ADDRESS SCRAMBLING

BACKGROUND

Memory (e.g., dynamic random access memory (DRAM)) stores data at locations that are addressed by memory addresses. The locations can be arranged or partitioned in memory banks or other arrangements. A memory bank can be a logical unit of storage in electronics and can consist of multiple rows and columns of storage units. One or more memory banks can be provided using one or more integrated circuit chips or packages.

DETAILED DESCRIPTION

Figure 1:
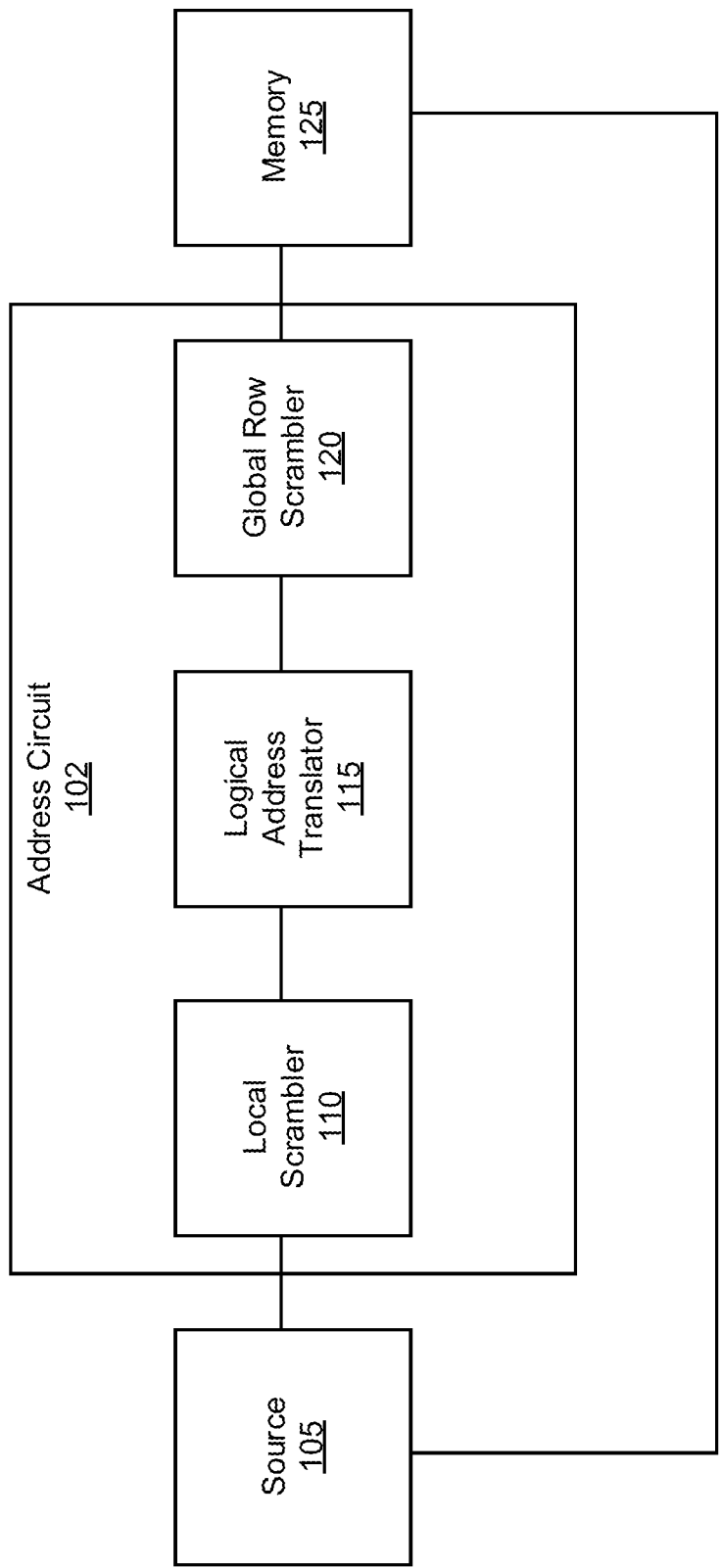
FIG. 1 is a schematic block diagram of a system, according to some embodiments.

The present disclosure relates to storage devices or memory. The present disclosure also relates to systems for and methods of addressing memory.

The present disclosure is also directed to systems and methods for address scrambling. Address scrambling can be used to spread accesses, which otherwise can be sequential and/or in the same region of memory, across a plurality of regions of memory. Address scrambling can be, include and/or may refer to receiving an entry index having a first value and/or first location, and changing the first value and/or first location to a different value (e.g., a second value) and/or second location in some embodiments. The second location can be, included in and/or correspond to a given region of memory and the second value of the entry index can map to this location within memory. The entry index may refer to and/or correspond to an entry within a lookup table, in some embodiments. For example, the entry index can map to an entry located within the plurality of regions of DRAM. The regions of DRAM may refer to blocks and/or banks in DRAM. The lookup tables may be stored in a plurality of regions within Dynamic Random Access Memory (DRAM). DRAM can be divided into banks and each bank can include a number of rows and a number of columns. The banks in DRAM can be located within a plurality of regions. Each row can be or include an entry, an address, a value and/or a location that corresponds to each row within DRAM. For example, the lookup tables may be integrated into contiguous blocks, banks and/or regions within DRAM, and a row in DRAM can include an entry stored in a lookup table.

Processing circuits, packet processors, switches, routers, etc. can interact with and/or retrieve information from DRAM. Only a single row within a first bank of DRAM is generally accessible at a time. For example, if the contents (e.g., an entry, a value, an address, a location, etc.) of a first row are currently being accessed by a packet processor then the contents of a second row cannot be accessed until the packet processor finishes interacting with the first row. When a subsequent row (e.g., the second row), within the same bank in DRAM, is requested while the packet processor is still accessing the first row (e.g., a Back-to-Back access) there can be a cycle penalty (e.g., the amount of time that it takes for the packet processor to complete its interaction with the first row). The cycle penalty can be in a range of at least 50-100 nanoseconds. During the cycle penalty, the subsequent row cannot be accessed which can delay or backup traffic. The traffic backup or delay that results from the cycle penalty can decrease the processing speed of circuits that access and interact with DRAM. The traffic backup or delay can also result in packets being dropped and/or not processed.

The technical solution and advantage of the present application provides a system including an address circuit that can receive a number of entry indexes from a source, and the address circuit can scramble the entry indexes from a plurality of first values corresponding to a plurality of first entries located within a region of memory to a plurality of second values located within a plurality of second regions within memory. The address circuit can scramble the plurality of entry indexes by changing, altering or otherwise adjusting the value and/or location of the plurality of entries corresponding to the plurality of entry indexes. For example, a first region (e.g., a first location within memory) can have a first row and a second row. The first row and the second row can each have an entry. As described herein the first row and the second row being called in subsequent cycles can result in a cycle delay. The scrambling of a first entry index corresponding to the entry located within the first row and the scrambling of a second entry index corresponding to the entry located within the second row results in the first entry index corresponding to an entry that is different than the entry located within the first row and results in the second entry index corresponding to an entry that is different that the entry located within the second row. The scrambling of the first entry index and the scrambling of the second entry index results in the first entry index and the second entry index corresponding to entries that are located in different regions of memory. In some embodiments, the system can include a first-in-first-out (FIFO) component that can absorb, hold, maintain, and/or otherwise keep entry indexes that correspond to a an entry located within a subsequent row within the same bank.

The scrambling performed by the address circuit can be bijective. The bijectivity of the scrambling techniques described herein can result from or include a one-to-one correspondence between an original address and a scrambled address, in some embodiments. For example, a first entry index and a second entry index would not both be scrambled to the same value. In some embodiments, the address circuit can receive the scrambled entry indexes and return the original entry indexes prior to scrambling.

The system may refer to at least one of a packet-switch network, a computer network, a communications network or a digital network, in some embodiments. For example, the packet-switch network can include transmitting signals over a digital network and the transmission can include packets. The packets can be or include entry indexes. The entry index, of a packet, can be calculated, identified and/or determined based on the contents of the packet and/or based on flow characteristic. The packets can include an address and/or correspond to an entry stored within a lookup table. The system can include memory (e.g., DRAM), a lookup circuit (e.g., the source that is providing the entry indexes to an address circuit) and the address circuit (e.g., the circuit that is scrambling the entry indexes and scrambling a plurality of addresses within memory. Memory may refer to any type of storage device. In some embodiments, memory includes one or more contiguous blocks, banks and/or regions within DRAM, in some embodiments.

The lookup circuit may refer to at least one of a packet processor, a network processor, an integrated circuit, a software programmable device, among other possible network equipment, network hardware and/or network circuitry, in some embodiments. In some embodiments, the lookup circuit can be in communication with memory. The communication can be direct (e.g., the lookup circuit is directly connected and directly communicates the memory) and/or indirect (e.g., a component receives data from the lookup circuit and the component then provides the data to the memory and/or the component receives data from the memory and the component provides the data to the lookup circuit). In some embodiments, the lookup circuit can be coupled with the memory. For example, the lookup circuit can be electrically coupled with the memory and the lookup circuit can provide a plurality of tables stored with the memory. The lookup circuit and the memory can be coupled directly (e.g., the lookup circuit and the memory are directly connected and coupled with one another) and/or indirectly (e.g., a component is coupled to the lookup circuit and then component is also coupled with the memory). The lookup circuit can access tables located within memory. The tables may refer to lookup tables, forwarding tables, external flow tables, state tables, and/or counter tables, in some embodiments. The tables can include a plurality of entries. An entry may refer to a location within memory (e.g., an address), a pointer that points to the location in memory, and/or among other types of information that can be stored in memory. An entry may have corresponding stored data and/or other information associated with it. Each entry may have an entry index. The entry indexes may refer to, point to, correspond to and/or pertain to each entry. The external flow tables can be stored in memory (e.g., DRAM banks), in some embodiments.

The address circuit may refer to circuitry such as gateways, routers, switches, bridges or repeaters, in some embodiments. Similarly, components of the address circuit may refer to circuitry such as gateways, routers, switches, bridges or repeaters, in some embodiments. The address circuit and/or a component thereof may be implemented as and/or included in at least one of a general purpose processor, a multicore processor, a programmable logic controller, among other possible circuitry and/or hardware. Similarly, the functionality of the address circuit and/or the components thereof may be stored, in memory, as software and/or as instructions and when the information (e.g., the software and/or instructions) stored in memory are executed, by a processor, results in the processor performing the functionality of the address circuit (e.g., the processor can scramble the plurality of entry indexes corresponding to a plurality of entries located in a lookup table) and/or performing the functionality of a component of the address circuit. The address circuit may be a single circuit that includes a plurality of components or the address circuit may be a collection of circuits, and each circuit can include a plurality of components. The address circuit can receive, from the lookup circuit, a plurality of entry indexes. The entry indexes may correspond to entries stored in lookup tables and the entry indexes can be associated with the lookup tables. The lookup tables and/or the entries may refer to a logical address that maps to data stored in memory, a physical address in memory, a translation of a logical address, a virtual address, a real address or a binary address, in some embodiments.

Some embodiments relate to a system. The system can include memory. The memory can store a plurality of tables. Each table can have a plurality of entries and each entry can have an entry index. The system can also include a lookup circuit. The lookup circuit can be coupled with the memory. The lookup circuit can provide a plurality of entry indexes of the plurality of tables to an address circuit. The address circuit can include a first circuit. The first circuit can include a plurality of entry scramblers. Each entry scrambler of the plurality of entry scramblers can have a scrambling technique. A first entry scrambler of the plurality of entry scramblers can receive, from the lookup circuit, a first entry index of the plurality of entry indexes of a first table of the plurality of tables. The first entry scrambler can also change, using the scrambling technique of the first entry scrambler, the first entry index, of the plurality of entry indexes of the first table, from a first value to a second value. The scrambling technique of the first entry scrambler can include a cryptographic process of encryption to encrypt the first entry index. The address circuit can also include a second circuit. The second circuit can include a plurality of translators. A first translator of the plurality of translators can receive, from the first entry scrambler, the second value of the first entry index. The first translator can translate the first entry index from the second value to a first value of an address within the memory. The address circuit can also include a third circuit. The third circuit can include a plurality of row scramblers. Each row scrambler of the plurality of row scramblers can have a first scrambling technique configured in a first manner. A first row scrambler, of the plurality of row scramblers, can receive, from the first translator, the first value of the address within the memory. The first row scrambler can also change, using the first scrambling technique of the first row scrambler, the address within the memory from the first value to a second value.

In some embodiments, the first circuit can include a second entry scrambler of the plurality of entry scramblers. The second entry scrambler can receive, from the lookup circuit, a first entry index of a second table of the plurality of tables. The second entry scrambler can also change, using the scrambling technique of the second entry scrambler, the first entry index, of the second table of the plurality of tables, from a first value to a second value. The first table of the plurality of tables can have a first width and a first depth. The second table of the plurality of tables can have a second width and a second depth, and at least one of the first width or the first depth can be different than the second width of the second depth.

In some embodiments, the third circuit can include a second row scrambler of the plurality of row scramblers. The second row scrambler can receive, from a second translator of the second circuit, a first value of a second address within the memory. The second row scrambler can change, using the first scrambling technique of the second row scrambler, the second address within the memory from the first value to a second value. The first value, of the address within the memory, can correspond to a location within a first region of a plurality of regions of the memory. The first value, of the second address within the memory, can correspond to a location within a second region of the plurality of regions of the memory. The second value, of the address within memory, can correspond to a first location within a third region of the plurality of regions of the memory, and the second value, of the second address within memory, can correspond to a second location within the third region of the plurality of regions of the memory.

In some embodiments, the first circuit can include a plurality of pipeline stages. The first circuit can implement a first pipeline stage of the plurality of pipeline stages by performing a first cycle walk to change the first entry index from the first value to the second value, determining that the second value of the first entry index is an illegal value, and outputting the second value of the first entry index to a second pipeline stage of the plurality of pipeline stages. The first circuit can change the first entry index to a legal value by implementing subsequent pipeline stages of the plurality of pipeline stages or by using a first mapping block. The third circuit can include a second plurality of pipeline stages. The third circuit can implement a first pipeline stage of the second plurality of pipeline stages by performing a first cycle walk to change the address within the memory from the first value to the second value, determining that the second value of the address within the memory is an illegal value, and outputting the second value of the address within the memory to a second pipeline stage of the second plurality of pipeline stages. The third circuit can change the address within the memory to a legal value by implementing subsequent pipeline stages of the second plurality of pipeline stages or by using a second mapping block. The first cycle walk, of the first pipeline stage of the plurality of pipeline stages, and a subsequent cycle walk, of a subsequent pipeline stage of the plurality of pipeline stages, can be performed in subsequent clock cycles, and the first cycle walk, of the first pipeline stage of the second plurality of pipeline stages, and a subsequent cycle walk, of a subsequent pipeline stage of the second plurality of pipeline stages, can be performed in subsequent clock cycles.

In some embodiments, the first mapping block can include a plurality of content addressable memory paired with a plurality of policy tables. The plurality of content addressable memory can store a plurality of legal entry index values and the plurality of policy tables can store a plurality of encrypted entry index values. The second mapping block can include a second a plurality of content addressable memory paired with a second plurality of policy tables, and the second plurality of content addressable memory can store a plurality of legal address values and the second plurality of policy tables can store a plurality of encrypted address values.

In some embodiments, the third circuit can include a second row scrambler of the plurality of row scramblers. The second row scrambler can receive, from a second translator of the second circuit, a first value of a second address within the memory. The second row scrambler can also change, using the first scrambling technique of the second row scrambler, the second address within the memory from the first value to a second value.

In some embodiments, the scrambling technique, of the first entry scrambler, can be the same as the scrambling technique of at least one additional entry scrambler of the plurality of entry scramblers, and the scrambling technique, of the first entry scrambler can be different than the scrambling technique of at least one second additional entry scrambler of the plurality of entry scramblers. An encryption key, of the scrambling technique of the first entry scrambler, can be different than an encryption key of the scrambling technique of the at least one additional entry scrambler of the plurality of entry scramblers, and the encryption key, of the scrambling technique of the first entry scrambler, can be the same as an encryption key of the scrambling technique of the at least one second additional entry scrambler of the plurality of entry scramblers.

In some embodiments, the scrambling technique, of the first entry scrambler, can include a block cipher. The block cipher can dictate the second value of the first entry index, and the block cipher can dictate a second value of each additional entry index of a first plurality of entry indexes of the first table.

In some embodiments, the first value of the first entry index can be translatable, by the first translator, to a second address within the memory. The second address within the memory can correspond to a location within a region of a plurality of regions of the memory. The region of the plurality of regions of the memory can include the first table of the plurality of tables. The first value of the address within the memory can correspond to a location within a second region of the plurality of regions of the memory. The first entry scrambler, responsive to changing the first entry index from the first value to the second value, breaks a sequential pattern within the memory, between the first entry index, and a second entry index of the first table of the plurality of tables.

In some embodiments, the first circuit can determine that the second value of the first entry index is an invalid value. The first circuit can also identify a predetermined value for the first entry index. The first circuit can also change the second value of the first entry index from the invalid value to the predetermined value.

Some embodiments relate to an address circuit. The address circuit can be in communication with a lookup circuit. The lookup circuit can be coupled with memory. The memory can store a plurality of tables. Each table can have a plurality of entries an each entry can have an entry index. The address circuit can include a first circuit. The first circuit can include a plurality of entry scramblers, each entry scrambler of the plurality of entry scramblers having a scrambling technique. A first entry scrambler of the plurality of entry scramblers can receive, from the lookup circuit, a first entry index of the plurality of entry indexes of a first table of the plurality of tables. The first entry scrambler can change, using the scrambling technique of the first entry scrambler, the first entry index, of the plurality of entry indexes of the first table of the plurality of tables, from a first value to a second value. The scrambling technique of the first entry scrambler can include a cryptographic process of encryption to encrypt the first entry index. The address circuit can include a second circuit. The second circuit can include a plurality of translators. A first translator of the plurality of translators can receive, from the first entry scrambler, the second value of the first entry index. The first translator can translate the first entry index from the second value to a first value of an address within the memory. The address circuit can also include a third circuit. The third circuit can include a plurality of row scramblers. Each row scrambler of the plurality of row scramblers can have a first scrambling technique configured in a first manner. A first row scrambler, of the plurality of row scramblers, can receive, from the first translator, the first value of the address within the memory. The first row scrambler can also change, using the first scrambling technique of the first row scrambler, the address within the memory from the first value to a second value.

In some embodiments, the first circuit can include a second entry scrambler of the plurality of entry scramblers. The second entry scrambler can receive, from the lookup circuit, a first entry index of a second table of the plurality of tables. The second entry scrambler can also change, using the scrambling technique of the second entry scrambler, the first entry index, of the second table of the plurality of tables, from a first value to a second value. The first table of the plurality of tables can have a first width and a first depth. The second table of the plurality of tables can have a second width and a second depth, and at least one of the first width or the first depth can be different than the second width or the second depth.

In some embodiments, the third circuit can include a second row scrambler of the plurality of row scramblers. The second row scrambler can receive, from a second translator of the second circuit, a first value of a second address within the memory. The second row scrambler can also change, using the first scrambling technique of the second row scrambler, the second address within the memory from the first value to a second value. The first value, of the address within the memory, can correspond to a location within a first region of a plurality of regions of the memory. The first value, of the second address within the memory, can correspond to a location within a second region of the plurality of regions of the memory. The second value, of the address within the memory, can correspond to a first location within a third region of the plurality of regions of the memory, and the second value, of the second address within the memory, can correspond to a second location within the third region of the plurality of regions of the memory.

In some embodiments, the first circuit can include a plurality of pipeline stages. The first circuit can implement a first pipeline stage of the plurality of pipeline stages by performing a first cycle walk to change the first entry index from the first value to the second value, determining that the second value of the first entry index is an illegal value, and outputting the second value of the first entry index to a second pipeline stage of the plurality of pipeline stages. The first circuit can change the first entry index to a legal value by implementing subsequent pipeline stages of the plurality of pipeline stages or by using a first mapping block. The third circuit can include a second plurality of pipeline stages. The third circuit can implement a first pipeline stage of the second plurality of pipeline stages by performing a first cycle walk to change the address within the memory from the first value to the second value, determining that the second value of the address within the memory is an illegal value, and outputting the second value of the address within the memory to a second pipeline stage of the second plurality of pipeline stages. The third circuit can change the address within the memory to a legal value by implementing subsequent pipeline stages of the second plurality of pipeline stages or by using a second mapping block. The first cycle walk, of the first pipeline stage of the plurality of pipeline stages, and a subsequent cycle walk, of a subsequent pipeline stage of the plurality of pipeline stages, can be performed in subsequent clock cycles, and the first cycle walk, of the first pipeline stage of the second plurality of pipeline stages, and a subsequent cycle walk, of a subsequent pipeline stage of the second plurality of pipeline stages, can be performed in subsequent clock cycles.

In some embodiments, the first mapping block can include a plurality of content addressable memory paired with a plurality of policy tables. The plurality of content addressable memory can store a plurality of legal entry index values and the plurality of policy tables can store a plurality of encrypted entry index values. The second mapping block can include a second a plurality of content addressable memory paired with a second plurality of policy tables, and the second plurality of content addressable memory can store a plurality of legal address values and the second plurality of policy tables can store a plurality of encrypted address values.

In some embodiments, the scrambling technique, of the first entry scrambler, can be the same as the scrambling technique of at least one additional entry scrambler of the plurality of entry scramblers, and the scrambling technique, of the first entry scrambler, can be different than the scrambling technique of at least one second additional entry scrambler of the plurality of entry scramblers. An encryption key, of the scrambling technique of the first entry scrambler, can be different than an encryption key of the scrambling technique of the at least one additional entry scrambler of the plurality of entry scramblers, and the encryption key, of the scrambling technique of the first entry scrambler, can be the same as an encryption key of the scrambling technique of the at least one second additional entry scrambler of the plurality of entry scramblers.

In some embodiments, the scrambling technique, of the first entry scrambler, can include a block cipher. The block cipher can dictate the second value of the first entry index, and the block cipher can dictate a second value of each additional entry index of a first plurality of entry indexes of the first table.

In some embodiments, the first value of the first entry index can be translatable, by the first translator, to a second address within the memory. The second address within the memory can correspond to a location within a region of a plurality of regions of the memory. The region of the plurality of regions of the memory can include the first table of the plurality of tables. The first value of the address within the memory can correspond to a location within a second region of the plurality of regions of the memory. The first entry scrambler, responsive to changing the first entry index from the first value to the second value, breaks a sequential pattern within the memory, between the first entry index, and a second entry index of the first table of the plurality of tables.

Some embodiments relate to a method of encryption of an entry index. The method can include receiving, by a first circuit, the entry index. The method can also include changing, by an entry scrambler of the first circuit using a scrambling technique of the entry scrambler, the entry index from a first value to a second value. The method can also include receiving, by a second circuit, the second value of the entry index. The method can also include translating, by a translator of the second circuit, the entry index from the second value to a first value of an address within memory. The method can also include receiving, by a third circuit, the first value of the address within the memory, and the method can include changing, by a row scrambler of the third circuit using a scrambling technique of the row scrambler, the address within the memory from the first value to a second value.

In some embodiments, the method can also include receiving, by the first circuit, a second entry index, and the method can include changing, by a second entry scrambler of the first circuit, the second entry index from a first value to a second value. The entry index can be included in a first table of a plurality of tables, and the second entry index can be included in a second table of the plurality of tables. The first table of the plurality of tables can have a first width and a first depth. The second table of the plurality of tables can have a second width and a second depth, and at least one of the first width or the first depth can be different than the second width or the second depth.

Some embodiments relate to a system. The system can include a first circuit, a second circuit and a third circuit. The first circuit can include an entry scrambler. The first circuit can receive an entry index. The entry scrambler use a scrambling technique to change the entry index from a first value to a second value. The second circuit can include a translator. The second circuit can receive the second value of the entry index. The translator can translate the entry index from the second value to a first value of an address within memory. The third circuit can include a row scrambler. The third circuit can receive the first value of the address within memory. The row scrambler can use a scrambling technique to change the address within memory from the first value to a second value.

Some embodiments relate to an address circuit. The address circuit can include a first circuit, a second circuit and a third circuit. The first circuit can include an entry scrambler. The first circuit can receive an entry index. The entry scrambler use a scrambling technique to change the entry index from a first value to a second value. The second circuit can include a translator. The second circuit can receive the second value of the entry index. The translator can translate the entry index from the second value to a first value of an address within memory. The third circuit can include a row scrambler. The third circuit can receive the first value of the address within memory. The row scrambler can use a scrambling technique to change the address within memory from the first value to a second value.

FIG. 1 depicts a schematic block diagram of a system 100, according to some embodiments. The system 100 can include at least one address circuit 102, at least one source 105, and least one memory 125. The address circuit 102 can include at least one local scrambler 110 (e.g., a first circuit), at least one logical address translator 115 (e.g., a second circuit) and at least one global row scrambler 120 (e.g. a third circuit). At least one of the local scrambler 110, the logical address translator 115, the global row scrambler 120 and/or components thereof can be, include or may refer to circuitry such as gateways, routers, switches, bridges, repeaters, controllers, processors, and/or any other circuitry and/or hardware described herein, in some embodiments. Similarly, at least one of the local scrambler 110, the logical address translator 115, and/or the global row scrambler 120 can be a single circuit that includes a plurality of components and/or at least one of the local scrambler 110, the logical address translator 115, and/or the global row scrambler 120 can be a collection of circuits, and each circuit can include a plurality of components.

The source 105 can be or include at least one of a packet processor, a lookup circuit, routers, switches, network elements, and/or terminals. The source 105 can provide, to the address circuit 102, a number of entry indexes for a number of lookup tables (stored in memory 125). The entry indexes can correspond to a number of entries and/or a number of addresses. For example, a first entry index can correspond to a first entry within at least one lookup table of the plurality of lookup tables. The entry index can also map to and/or be translated to a physical memory address (e.g., address within memory 125 storing the entry, storing contents corresponding to the entry index, and/or storing the lookup tables). The source 105 can communicate with memory 125. The source 105 can also communicate with the address circuit 102 and/or a component thereof.

The memory 125 can store, hold, locate or otherwise maintain the number of lookup tables and/or the number of entries stored in the lookup tables and corresponding to a number of entry indexes associated with the lookup tables. Each lookup table can include a plurality of entries corresponding to a plurality of entry indexes associated with the lookup table, in some embodiments. For example, the memory 125 can be and/or include Dynamic Random Access Memory (DRAM) and the DRAM can include a plurality of regions. The plurality of regions can be, include and/or correspond to a plurality of banks within memory 125, in some embodiments. Each bank of the plurality of banks can include a plurality of rows and a plurality of columns, in some embodiments. An entry index of the number of entry indexes, provided by the source 105 to the address circuit 102, can correspond to, map to and/or translate to at least one entry located within a plurality of columns within a particular row, and the particular row can be located within a particular bank and/or a particular region within the memory 125, in some embodiments.

The local scrambler 110 can receive, from the source 105, a number of entry indexes. The number of entry indexes can correspond to entries located in at least one lookup table. The local scrambler 110 can change a first entry index, of the plurality of entry indexes of a lookup table of the plurality of lookup tables, from a first value to a second value. In some embodiments, the first value of the entry index may refer to and/or correspond to the location of a first entry located within the lookup table. The first value of the first entry index may corresponded to a first entry within the first table. For example, the first value may correspond to entry 0 located within the first table. The second value of the first entry index may correspond to a second entry within the first table. For example, the second value may correspond to entry 17 within the first table.

The local scrambler 110 can be or include a block cipher and the block cipher can scramble (e.g., change) the first value to the second value. The block cipher may refer to a Feistel cipher, Substitution-Permutation Network, and/or among other possible ciphers. The second value can be generated based on a key and/or a set of keys associated with the block cipher. For example the number of keys associated with a Feistel cipher (e.g., a block cipher) can be equal to the number of cipher rounds and/or number of cycle walks (e.g., number of stages in an encryption pipeline). The encryption keys may refer to cipher keys and/or a scrambling keys, all of which can determine the second value. The second value may refer to and/or correspond to a second entry within the same lookup table as that of the first value of the first entry index. For example, the first value of the first entry index can be an entry located in entry 10 within the lookup table and the second value of the first entry index can an entry located in entry 20 within the lookup table. The local scrambler 110 can provide the second value of the first entry index to the logical address translator 115.

The logical address translator 115 can receive, from the local scrambler 110, the second value of the first entry index. The logical address translator 115 can translate the first entry index from the second value to a first value of an address within memory 125. For example, the logical address translator 115 can translate the first entry index to a logical address, and the logical address can map to a physical address within memory 125. The first value of the address within memory may refer to a logical address that maps to, corresponds to and/or is associated with a physical DRAM address. For example, the first value of the address within memory may refer to a logical address that maps to a location within a bank and/or region in DRAM. The translation of the first entry index from the second value to the first value of the address within memory can include several calculations, in some embodiments. The calculations can include at least one of parameters and/or calculations shown below:

Parameter: # of Words in a Row –

$\quad$ 1 word is one $DB$ entry, word width = width of entry, =

$\quad\quad$ #columns_in_a_row / #columns_in_a_word

Parameter: # of Words in a $PS$–Stripe =

$\quad\quad$ (# of Banks per Channel) * (# of Words in a Row)

Parameter: # of Words in a Stripe =

$\quad\quad$ (# of Channels) * (# of Words in a $PS$–Stripe)

$\quad$ Parameter: # of Columns in a Word

Stripe Address = Quotient of (Word Index)/(# of Words in a Stripe)

$\quad$ Word Index in a Stripe = Remainder of the above.

Channel Address =

$\quad$ Quotient of (Word Index in a Stripe)/(# of Words in a $PS$–Stripe)

$\quad$ Word Index in a $PS$–Stripe = Remainder of the above.

Bank Address =

$\quad$ Quotient of (Word Index in a $PS$–Stripe)/(# of Words in a Row)

$\quad$ Word Index in a Row = Remainder of the above.

Column Address = (Word Index in a Row) * (# of Columns in a Word)

Final Address =

$\quad$ (Combination of (Stripe Address, Channel Address, Bank Address, $\quad\quad$ Column Address) in any order) + $DRAM$ Base Address Offset Row Address = Bits of Final Address $\quad\quad$ containing (Stripe Address, Channel Address, Bank Address)

The logical address translator 115 can provide the first value of $\quad$ the address within memory 125 to the global row scrambler 120.

The global row scrambler 120 can receive, from the logical address translator 115, the first value of the address within memory 125. The first value of the address can correspond to a location within memory 125. The global row scrambler 120 can change the address correspond to the location within memory 125 from the first value to a second value. The second value of the address within memory 125 can be a physical DRAM address. In some embodiments, the second value of the address within memory may refer to a physical DRAM address that is located in a different bank or region within DRAM than the region that the first value of the address corresponds to. For example, the first value of the address within memory 125 can map to, correspond to, and/or be translated to a first physical address in a first bank within DRAM and the second value of the address within memory 125 can be a first physical address in a second bank within DRAM. The physical DRAM address (e.g., the second value of the address within memory) can correspond to a given column within a row of DRAM. The global row scrambler 120 can scramble the row address and the global row scrambler 120 can leave the column address part intact.

In some embodiments, the first entry index can be considered twice scrambled responsive to the generation of the second value (e.g. first scramble) of the first entry index and the generation of the second value (e.g., the second scramble) of the address within memory 125. In particular, the first entry index can be scrambled (e.g., changed from the first value to the second value) within the corresponding lookup table for the first entry index, resulting in the entry corresponding to the first entry index being changed. For example, the entry corresponding to the first entry index can be change from the entry located within row 0 (e.g., the first value) to an entry located within row 15 (e.g., the second value). At least one of first value and/or the second value can map to, correspond to and/or translate to a physical address within memory 125. The second value of the first entry index can be translated, by the logical address translator 115, to the first value of the address within memory 125. The first value of the address within memory 125 can be a logical DRAM address value and the first value can map to, correspond to and/or translate to a physical DRAM address. The physical DRAM address can be located within a first bank and/or region in DRAM (e.g., memory 125). The first value of the address can be scrambled (e.g., changed from the first value to the second value) to second value. The second value of the address can be a physical DRAM address, and the physical DRAM address can be located within a second bank and/or region in DRAM (e.g., memory 125). The physical DRAM address, corresponding to the first value of the address within memory 125, can be a different physical DRAM address to that of the physical DRAM address corresponding to the second value of the address within memory 125.

The scrambling of the entry index twice and the scrambling of the address within memory 125, as described above, can provide the technical solution described herein as the first entry index has been scrambled from a first value (e.g., the first entry index corresponding to a first entry having a first location within a first lookup table) to a second value (e.g., the first entry index corresponding to a second entry having a second location within the first lookup table), and then scrambled from an address having a first value (e.g., a value corresponding to an address within a first bank of DRAM) to a second value (e.g., a value corresponding to an address within a second bank of DRAM). Similarly, a second entry index of the plurality of entry indexes of the lookup table, responsive to being twice scrambled, can be scrambled from the first bank of DRAM to a third bank of DRAM. The entry corresponding to the first entry index being placed in the second bank of DRAM and the second entry corresponding to the second entry index being placed in the third bank of DRAM can prevent, by breaking the sequential access pattern, the cycle penalty associated with waiting to access the second entry corresponding to the second entry index if both the first entry and the second entry were still located in the first bank of DRAM. As described herein, when a first entry, stored within a lookup table and the lookup table is located within a first bank and/or region in DRAM, is accessed a second entry, that is also stored within the lookup table, cannot be subsequently accessed given that the first entry and the second entry are located within the same bank and/or region of DRAM. This can result in the cycle delay described herein.

Figure 2:
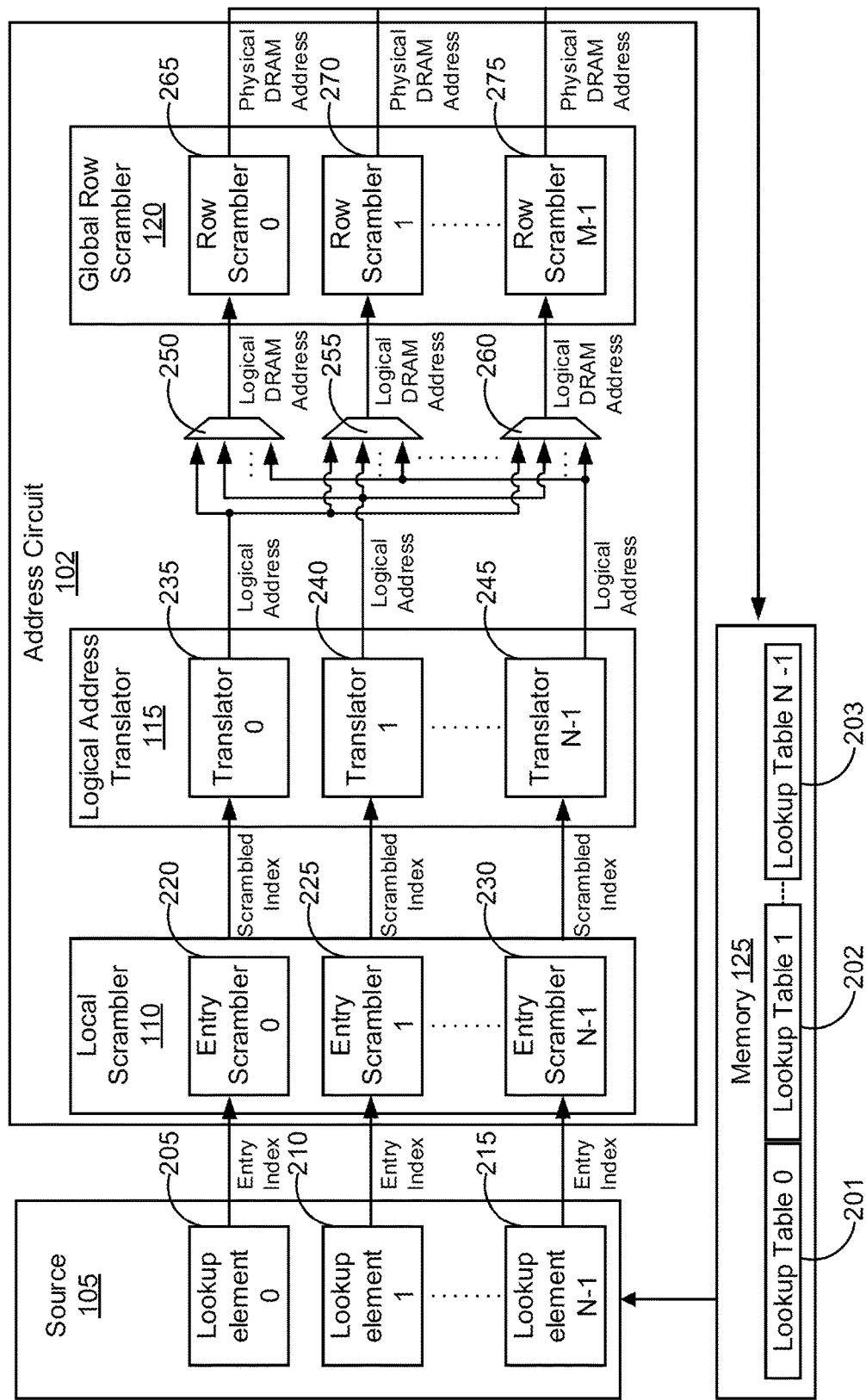
FIG. 2 is a more detailed schematic block diagram of the system illustrated in FIG. 1, according to some embodiments.

FIG. 2 is a schematic block diagram of the system 100 illustrated in FIG. 1, according to some embodiments. Memory 125 can include, maintain, keep and/or otherwise store at least one lookup table. FIG. 2 depicts an example of memory 125 including lookup table 0 (indicated with reference number 201), lookup table 1 (indicated with reference number 202), and lookup table N−1 (indicated with reference number 203). The lookup tables (e.g., tables 201, 202, and 203) can be the lookup tables described herein. For example, lookup table 201 (e.g., a first lookup table) can include a plurality of entries, and each entry can correspond to a plurality of entry indexes (including the first entry index described above). The lookup tables (e.g., tables 201, 202, and 203) can be or include forwarding tables, state tables (to maintain flow state) and/or counter tables stored in DRAM. In some embodiments, memory 125 can include N lookup tables. For example, N can equal 10 and then memory 125 can include lookup tables 0, 1, 2, 3, 4, 5, 6, 7, 8 and 9 (e.g., lookup table N−1).

The source 105 can include at least one lookup element. The source 105 and/or components thereof may refer to a lookup circuit and/or the source 105 can include the circuitry and/or hardware similar to that of the lookup circuit described herein. For example, the source 105 can be a packet processor. The lookup elements can manage accesses to the lookup tables (e.g., lookup tables 201, 202, and 203) stored in memory 125. The lookup elements can manage accesses by at least one of sending an entry index corresponding to an entry to be accessed, sending data to be written if the request is a write access, and/or receiving read data if the request is a read access. The number of lookup elements included in the source 105 can correspond to and/or match the number of lookup tables located within memory 125. For example, memory 125 can include five (0, 1, 2, 3, and 4) lookup tables and the source 105 can include five lookup elements. Lookup element 0 is indicated with reference number 205. Lookup element 1 is indicated with reference number 210. Lookup element N−1 is indicated with reference number 215. Each lookup element (e.g., elements 205, 210 and/or 215) can provide at least one of a plurality of entry indexes and/or a plurality of addresses. For example, lookup element 205 can receive a plurality of entry indexes associated with the lookup table 201 (e.g., a first lookup table). The plurality of entry indexes can each have a first value. The first value may refer to and/or correspond to a first entry and/or a first location within the lookup table. For example, a first entry index can correspond to a first entry (e.g., entry 0) of a lookup table (e.g., lookup tables 201, 202, and 203), and entry 0 and/or the contents of entry 0 (e.g., the first entry) can correspond to a first value of the first entry index. The source 105 and/or the lookup elements thereof can provide the plurality of entry indexes, having the first value, to the local scrambler 110. The plurality of entry indexes can be provided directly (e.g., the source 105 provides the entry indexes directly to the local scrambler 110) and/or the plurality of entry indexes can be provided indirectly (e.g., the plurality of entry indexes a first provided to a given component and the given component then provides the plurality of entry indexes to the local scrambler 110). FIG. 2 depicts the first value of the entry indexes being provided to the local scrambler 110 as an entry index.

The local scrambler 110 can include a number of entry scramblers. The entry scramblers may refer to circuitry and/or hardware similar to that of the address circuit 102 and/or a component thereof, in some embodiments. For example, the entry scramblers may be a general purpose processors that execute instructions causing the general purpose processors to perform functionality similar to that of the entry scramblers. The number of entry scramblers can correlate to the number of lookup tables (e.g., lookup tables 201, 202, and 203) maintained within the memory 125 and/or the number of entry scramblers can correlate to the number of lookup elements. Each entry scrambler, of the number of entry scramblers, can include a scrambling technique. The scrambling technique may refer to at least one of a number of instructions and/or computation steps that are executed to scramble the plurality of entry indexes, a process that is performed to change the entry indexes from a plurality of first values to a plurality of second values and/or hardware implementations of the entry scramblers, in some embodiments.

The scrambling technique, in some embodiments, can be or include the cryptographic process of encryption, and may involve encrypting using a Format Preserving Encryption scheme (among other possible methods of encoding information), the first value of the entry index to a second value. For example, the entry scramblers can include a block cipher and the block cipher can dictate how the entry indexes are scrambled (e.g., the block cipher dictates the second value of each entry index scrambled by the entry scramblers). The block cipher can dictate the second value of each entry index by at least one of impacting, influencing, determining, guiding, establishing, designating and/or otherwise selecting the second value of each entry index based on the first value of the entry indexes. For example, a first entry scrambler can have a first block cipher and/or a second block cipher and the second value of a first entry index, scrambled by the first entry scrambler, can depend on which block cipher is included in the first entry scrambler (e.g., the first value is scrambled to a first given second value, with the first block cipher, and/or the first value is scrambled to a second given second value with the second block cipher). The scrambling techniques of the entry scramblers can include a cryptographic process of encryption. The cryptographic process of encryption may refer to the steps that are implemented and/or executed by the entry scramblers to change the entry indexes from the first values to the second values, performing format-preserving encryption (FPE), among other possible forms of encoding information (e.g., scrambling the entry indexes), in some embodiments. The circuits used to implement the entry scrambler may be pipelined (e.g., the circuits can receive a new entry index as an input every clock cycle and produce a new scrambled index output every clock cycle).

Entry scrambler 0 is indicated with reference number 220. Entry scrambler 1 is indicated with reference number 225. Entry scrambler N−1 is indicated with reference number 230. Each entry scrambler (e.g., entry scramblers 220, 225, and 230) can receive the corresponding first value of the entry index, and the entry scramblers can scramble the entry index from the first value to the second value. For example, the entry scrambler 220 can receive, from the lookup element 205, a first entry index, and the entry scrambler 220 can change the first entry index from a first value to a second value. The corresponding entry indexes can be provided directly (e.g., the lookup elements provide the entry indexes directly to the entry scramblers) and/or the plurality of entry indexes can be provided indirectly (e.g., the plurality of entry indexes a first provided to a given component and the given component then provides the plurality of entry indexes to the entry scramblers). The local scrambler 110 and/or the entry scramblers thereof can provide the scrambled entry indexes (e.g., entry indexes changed from a first value to a second value) to the logical address translator 115. FIG. 2 depicts the second value of the entry indexes being provided to the logical address translator 115 as a scrambled index.

The scrambling technique of a first entry scrambler (e.g., entry scrambler 220) can be the same as the scrambling technique of at least one additional entry scrambler of the plurality of entry scramblers including in the local scrambler 110. For example, the scrambling technique of the entry scrambler 220 can be the same as the scrambling technique of the entry scrambler 225. The scrambling technique of the first entry scrambler (e.g., entry scrambler 220) can be different than the scrambling technique of at least one additional entry scrambler of the plurality of entry scramblers including in the local scrambler 110. For example, the scrambling technique of the entry scrambler 220 can be different than the scrambling technique of the entry scrambler 230. An encryption key of the scrambling technique of the first entry scrambler (e.g., entry scrambler 220) can be the same as an encryption key of the scrambling technique of at least one additional entry scrambler of the plurality of entry scramblers including in the local scrambler 110. For example, the encryption key of the scrambling technique of the entry scrambler 220 can be the same as the encryption key of the scrambling technique of the entry scrambler 225. The encryption key of the scrambling technique of the first entry scrambler (e.g., entry scrambler 220) can be different than an encryption key of the scrambling technique of at least one additional entry scrambler of the plurality of entry scramblers including in the local scrambler 110. For example, the encryption key of the scrambling technique of the entry scrambler 220 can be different than the encryption key of the scrambling technique of the entry scrambler 230.

The logical address translator 115 can include a number of translators. The translators may refer to circuitry and/or hardware similar to that of the address circuit 102 and/or a component thereof, in some embodiments. For example, the translators may be general purpose processors that execute instructions causing the general purpose processors to perform functionality similar to that of the translators. The translators may also refer to and/or include pipeline circuits and/or circuitry. The translators can receive a new scrambled index every clock cycle and produce a new logical DRAM every clock cycle, in some embodiments. The number of translators can correlate to the number of lookup tables (e.g., lookup tables 201, 202, 203) maintained within memory 125, the number of lookup elements and/or the number of entry scramblers. Translator 0 is indicated with reference number 235. Translator 1 is indicated with reference number 240. Translator N-1 is indicated with reference number 245. Each translator (e.g., translators 235, 240, and 245) can receive the scrambled entry indexes, and the translators can translate the scrambled entry indexes to a logical DRAM address (e.g., a first value of a plurality of addresses within memory 125). The logical address translator 115 and/or the translator thereof can provide the first value of the addresses within memory 125 to the global row scrambler 120. FIG. 2 depicts the first value of the addresses within memory 125 being provided to the global row scrambler 120 as logical address.

The logical addresses can be provided to or run through a number of multiplexers. The multiplexers are indicated with reference numbers 250, 255, and 260. The multiplexers can route the logical addresses to the global row scrambler 120. The global row scrambler 120 can include a number of row scramblers. The row scramblers may refer to circuitry and/or hardware similar to that of the address circuit 102 and/or a component thereof, in some embodiments. For example, the row scramblers can be general purpose processors that execute instructions causing the general purpose processors to perform functionality similar to that of the row scramblers. The row scramblers can use scrambling techniques (e.g., a first scrambling technique) configured in a manner (e.g., a first manner). In some embodiments, the row scramblers can each have the same scrambling technique and the scrambling techniques can be configured in an identical manner (e.g., an identical first manner). The scrambling technique may refer to similar techniques to that of the entry scramblers described herein, in some embodiments. For example, the row scramblers can be implemented using a block cipher scrambler, and each block cipher, included in the block cipher scrambler, can be the same block cipher having the same key or set of keys (e.g., identical scrambling technique configured in an identical manner). To continue this example, the identical scrambling techniques of the row scramblers can indicate that a first row scrambler and a second row scrambler, if given the same address in memory, can scramble the same address in memory to the same second address (e.g., the first row scrambler and the second row scrambler would scramble the address in an identical way).

The row scramblers having the same block cipher and the same keys can allow for the global row scrambler 120 to scramble a plurality of addresses within memory without having addresses scrambled to the same address within memory. For example, if the block cipher of a first row scrambler and a block cipher of a second row scrambler were different the first row scrambler and the second row scrambler could scramble different addresses (e.g., a first address and a second address) to the same address (e.g., a third address). The scrambling of the first address (by the first row scrambler) and the scrambling of the second address (by the second row scrambler) to the same third address can result in writes to one lookup table corrupting the contents of another lookup table.

The number of row scramblers can correspond with the number of DRAM read/write (R/W) interfaces. For example, if there are three DRAM R/W interfaces then there will be 3 row scramblers. Row scrambler 0 is indicated with reference number 265. Row scrambler 1 is indicated with reference number 270. Row scrambler M-1 is indicated with reference number 275. Each row scrambler (e.g., row scramblers 265, 270, and 275) can receive the logical addresses (e.g., logical DRAM addresses), and the row scramblers can scramble the logical DRAM addresses to physical DRAM addresses (e.g., the second value of the addresses within memory 125). FIG. 2 depicts the second value of the address within memory 125 as physical DRAM address. The physical DRAM addresses can correspond to the address of each entry index in a subsequent DRAM bank.

In some embodiments, a first entry scrambler, of the plurality of entry scramblers within the local scrambler 110, can receive, from the source 105, a first entry index of a plurality of entry indexes within a first lookup table (e.g., one of the lookup tables 201, 202, or 203). For example, the entry scrambler 220 (e.g., the first entry scrambler) can receive, from the lookup element 205, a first entry index corresponding to a first entry located within the lookup table 201 (e.g., a first lookup table). The entry scrambler 220 can change the first entry index from a first value to a second value. The entry scrambler 220 can use the scrambling technique, of the entry scrambler 220, to change the first entry index from the first value to the second value. The scrambling technique can include a cryptographic process of encryption. The first value of the first entry index can correspond to a first entry of the first lookup table and the second value of the first entry index can correspond to a second entry of the first lookup table. The entry scrambler 220 can provide, to the logical address translator 115, the second value of the first entry index. In some embodiments, the entry scrambler 220 can continue to receive, from the lookup element 205, entry indexes, and the entry scrambler 220 can change the number of entry indexes from a number of first values to a number of second values.

In some embodiments, a first translator, of the plurality of translators within the logical address translator 115, can receive, from the first entry scrambler, the second value of the first entry index. For example, the translator 235 (e.g., the first translator) can receive, from the entry scrambler 220, the second value of the first entry index. The translator 235 can translate the first entry index from the second value to a first value of an address within memory 125. For example, the translator 235 can translate the second value of the first entry index to a logical DRAM address (e.g., the first value of the address within memory 125). The translator 235 can provide, to the global row scrambler 120, the first value of the address within memory 125. In some embodiment, the translator 235 can continue to receive, from the entry scrambler 220, a number of entry indexes having a number of second values, and the translator 235 can translate the number of entry indexes from the number of second values to a number of first values of a number of addresses within memory 125.

In some embodiments, a first row scrambler, of the plurality of row scramblers within the global row scrambler 120, can receive, from the first translator, the first value of the address within memory 125. For example, the row scrambler 265 (e.g., the first row scrambler) can receive, from the translator 235, the first value of the address within memory 125. The row scrambler 265 can change, using the scrambling technique of the row scrambler 265, the address within memory from the first value to the second value.

In some embodiments, a number of entry scramblers can receive, from the source 105, a number of first entry indexes within a number of lookup tables. For example, the entry scrambler 225 (e.g., a second entry scrambler) can receive, from the lookup element 210, a first entry index of a plurality of entry indexes associated with a second lookup table (e.g., one of the lookup tables 201, 202, or 203). The entry scrambler 225 can change, using the scrambling technique of the entry scrambler 225, the first entry index from first value to a second value. The scrambling technique can use the cryptographic process of encryption to change the first entry index from the first value to the second value.

In some embodiments, a second row scrambler, of the plurality of row scramblers within the global row scrambler 120 can receive, from a second translator, the first value of a second address within memory 125. For example, the row scrambler 270 (e.g., the second row scrambler) can receive, from the translator 240 (e.g., the second translator), the first value of the second address within memory 125. The row scrambler 270 can change the second address within memory 125 from the first value to a second value. The first value of the first address within memory 125 (e.g., the address within memory translated, by the translator 235, from the second value of the first entry index) can correspond to a location within a first region of memory 125 (e.g., a given row in a first bank). The first value of the second address within memory 125 can correspond to a location within a second region of memory 125 (e.g., a given row in a second bank). The second value of the first address within memory 125 (e.g., the result of the row scrambler 265 changing the first address within memory) can correspond to a first location within a third region of memory 125 (e.g., a first given row within a third bank). The second value of the second address within memory 125 can correspond to a second location within the third region of memory 125 (e.g., a second given row within the third bank)

The row scrambler 270 can also receive, from the translator 240, a first value of a third address within memory 125, and the row scrambler 270 can change the third address from the first value to a second value. In some embodiments, the first row scrambler, can receive, from the first translator, a first value of a fourth address within memory 125. For example, the row scrambler 265 (e.g., first row scrambler) can receive, from the translator 235 (e.g., first translator), the first value of the fourth address within memory 125. The row scrambler 265 can change the fourth address from the first value to the second value.

In some embodiments, a first lookup table (e.g., one of the lookup tables 201, 202, or 203) can have a first depth and a first width. The first depth may refer to the number of rows and/or entries located within the first lookup table and the first width may refer to the number of bits of each entry, in some embodiments. For example, the lookup table 201 (e.g., the first lookup table) can include 1024 (e.g., 1K) entries (e.g., the first depth) and each entry can be 100 bits (e.g., the first width). The entries located within the lookup table 201 can be 0, 1, 2, 3 . . . 1021, 1022, and 1023. In some embodiments, a second lookup table (e.g., one of the lookup tables 201, 202, or 203) can have a second depth (e.g., the number of rows and/or entries located within the second lookup table) and a second width (e.g., the number of bits of each entry). The second depth and/or the second width can be less than, greater than and/or equal to the first depth and/or the first width. For example, the lookup table 202 (e.g., the second lookup table) can include 2048 (2K) entries (e.g., the first depth) and each entry can be 270 bits (e.g., the second depth). In some embodiments, a third lookup table (e.g., one of the lookup tables 201, 202, or 203) can have a third depth (e.g., the number of rows and/or entries located within the third lookup table) and a third width (e.g., the number of bits of each entry). The third depth and/or the third width can be less than, larger than and/or equal to at least one of the first depth, the second depth, the first width and/or the second width. For example, the lookup table 203 (e.g., the third lookup table) can include 4096 (4K) entries (e.g., the third depth) and each entry can be 1024 bits (e.g., the third width). In this example described above the lookup tables (e.g., lookup tables 201, 202, and 203) maintained by memory 125 would include a total of 7 k entries (e.g., 7168 entries) and the entries can correspond to a plurality of entry indexes associated with the lookup tables (e.g., lookup tables 201, 202, and 203).

In some embodiments, the lookup tables (e.g., lookup tables 201, 202, and 203) and/or the plurality of entries, corresponding to the plurality of entry indexes, located within each lookup table can be, correspond to, map to and/or be located within DRAM banks. The DRAM banks can be and/or included in memory 125. Each DRAM bank can have a plurality of rows. For example, a first DRAM bank can have a first number of rows. Each row of the DRAM bank can hold, keep, store, and/or maintain at least one entry corresponding to an entry index associated with the lookup tables, in some embodiments. For example, a first row within a first DRAM bank can hold at least one entry corresponding to an entry index associated with the lookup table 201. In some embodiments, a single row within a DRAM bank can hold a plurality of entries. For example, a first lookup table (e.g., one of the lookup tables 201, 202, or 203) can include 1024 entries, and a first row (within a first DRAM bank maintaining the first lookup table) can hold four entries. In this example, the first DRAM bank can have a total of 256 rows, and each row can hold four entries. For example, the first row can hold entries corresponding to entry indexes 0, 1, 2, and 3 (e.g., four entries corresponding to four entry indexes), and a subsequent row can hold entries corresponding to entry indexes 4, 5, 6, and 7.

The first value of the first entry index can be translatable, by the first translator (e.g., the translator 235), to a second address within memory 125. For example, if the translator 235 where to receive the first value of the first entry index, the translator 235 can translate the first value of the first entry index to an address within memory 125 (e.g., a second address within memory 125). The first address within memory 125 and the second address within memory 125 can be different. The second address within memory 125 can correspond to a location within a region of the plurality of regions of memory 125. For example, the second address within memory may refer to and/or correspond to a first row within a first bank of DRAM (e.g., memory 125). The region of memory 125 that includes the second address within memory 125 can also include the first table of the plurality of tables. For example, the first table of the plurality of tables can located within a plurality of rows within the first bank of DRAM. The first value of the address within memory 125 (e.g., the address within memory translated by the translator 235 from the second value of the first entry index) can correspond to a location within a second region of the plurality of regions of memory 125. For example, the first value of the address within memory 125 may refer to and/or correspond to a given row within a second bank of DRAM (e.g., memory 125).

The first entry scrambler (e.g., entry scrambler 220) can, responsive to changing the first entry index from the first value to the second value, break a sequential pattern within memory 125, between the first entry index, and a second entry index of the first table of the plurality of tables. The sequential pattern may refer to the first value of the first entry index and the first value of the second entry index both being located in the same region in memory resulting in subsequent entries within the first table being inaccessible for a certain amount of time and/or cycles while the first value of the first entry index is accessed. For example, the first table can be included in sequential blocks and/or rows within a first bank of DRAM and the scrambling of the first entry index to the second value results in the first entry index translating to a region and/or bank of memory 125 that is different from the region and/or bank of memory including the first table.

In some embodiments, at least one of the local scrambler 110 and/or a component thereof (e.g., the entry scramblers 220, 225, 230), the logical address translator 115 and/or a component thereof (e.g., the translators 235, 240, 245) and/or the global row scrambler 120 and/or a component thereof (e.g., the row scramblers 265, 270, 275) can receive the plurality of entry indexes associated with at least one lookup table (e.g., lookup tables 201, 202, and 203) having at least one of the first depth, the second depth and/or the third depth. For example, the entry scrambler 220 can be designed, arranged, and/or otherwise configured to receive entry indexes from a lookup table 203 having the first depth.

In some embodiments, at least one of the local scrambler 110 and/or a component thereof (e.g., the entry scramblers 220, 225, 230), the logical address translator 115 and/or a component thereof (e.g., the translators 235, 240, 245) and/or the global row scrambler 120 and/or a component thereof (e.g., the row scramblers 265, 270, 275) can be designed, arranged and/or otherwise configured to receive a number of entry indexes corresponding to a number of entries located within a single DRAM row. For example, the entry scrambler 220 can be designed to receive a plurality of entry indexes associated with a first lookup table (e.g., one of the lookup tables 201, 202, or 203), and each entry index, associated with the first lookup table, can correspond to an individual entry located within subsequent rows within a first DRAM bank (e.g., a first row includes a first entry corresponding to a first entry index, and a second row includes a second entry corresponding to a second entry index). Additionally, the entry scrambler 225 can be designed to receive a plurality of entry indexes associated with a second lookup table (e.g., the lookup tables 201, 202, and 203), and a number of entries located within the second lookup table can be located together within subsequent rows within a second DRAM bank (e.g., a first row includes both a first entry and a second entry, and a second row includes both a third entry and a fourth entry).

Figure 3A:
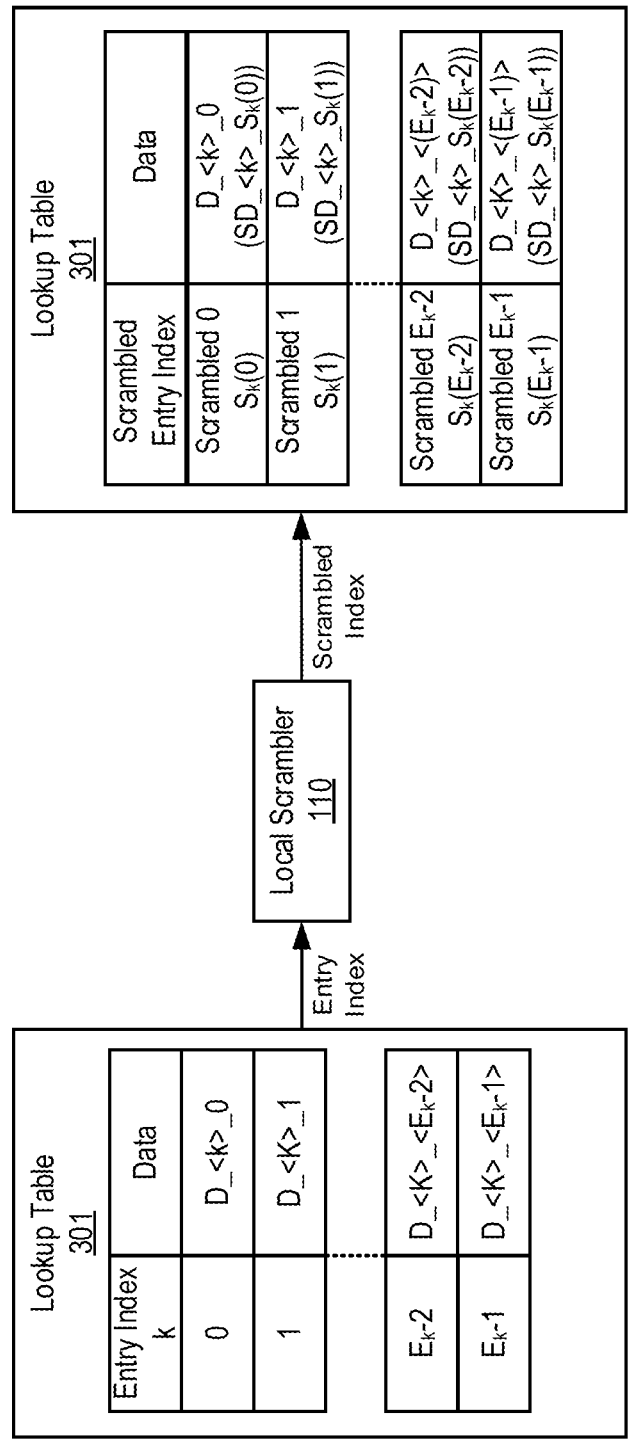
FIG. 3A is a block diagram of a memory mapping for a table, according to some embodiments.

FIG. 3A is a block diagram of a first memory mapping of a plurality of entry indexes associated with at least one lookup table 301, according to some embodiments. The memory mapping, on the left side, includes the lookup table 301 prior to any scrambling by the local scrambler 110 and the memory mapping, on the ride side, includes the lookup table 301 after the local scrambler 110 has scrambled the entry indexes associated with the lookup table 301. The lookup table 301 can be at least one of the lookup tables described herein (e.g., the lookup tables 201, 202, or 203). For example, the lookup table 301 can be the lookup table 201. The lookup table 301 can be associated with $E_k$ entry indexes and the $E_k$ entry indexes can be associated with K entries located within the lookup table 301. Each entry index of the $E_k$ entry indexes can correspond to, pertain to and/or can include data (e.g., an entry). FIG. 3A depicts entry index 0 corresponding to data 0 (e.g., D_<k>_0)), entry index 1 corresponding to data 1 (e.g., D_<k>_1), entry index $E_k$-2 corresponding to D_<k>_<$E_k$-2>, and entry index $E_k$-1 corresponding to D_<k>_<$E_k$-1>. The entry indexes associated with the lookup table 301 can be provided to the local scrambler 110. The local scrambler 110 can scramble the entry indexes from a number of first values to a number of second values. For example, the entry index 0 can be scrambled from entry 0 (e.g., the first value) to a second value (e.g., $S_k(0)$), and $S_k$ can be the scrambling function for lookup table 301. In some embodiments, <$S_k(x)$>can correspond to a scrambling function, a scrambling technique and/or an encryption process that is performed by the local scrambler 110 while changing the entry index "x" from the first value to the second value. FIG. 3A depicts each entry index associated with the lookup table 301 having been scrambled from a first value to a second value. FIG. 3A also depicts each scrambled entry index corresponding to the data of a subsequent entry stored in the lookup table 301. For example, the second value (e.g., SD_<k>_$S_k(0)$) of the scrambled entry 0 is shown to be equal to D<k><0>. For example, <$S_k(0)$> can be equal to 5, and in this example, SD_<k>5=D<k>0. In this non-limiting example, the data corresponding to entry index 0 would now correspond to the data of scrambled entry index 5. Some equations are provided below:

$E_k$ = number of entry indexes in lookup table 301

D_<k>_<i> = data at entry index $i$ for table $k$;

$i$ is the pre-scrambling index (e.g., the first value)

SD_<k>_<i> = data at scrambled entry index $i$ for table $k$ $S_k(x)$ = scrambling function for lookup table 301

$$SD\_<k>\_<S_k(i)> = D\_<k>\_<i>$$

In some embodiments, the equations above can be used to determine the data that is corresponds to with each scrambled entry index. As a non-limiting example, $S_k(E_k-1)$ can equal 17. In this example, SD_<k>_<17> can equal D_<k>_<$E_k-1$>.

Figure 3B:
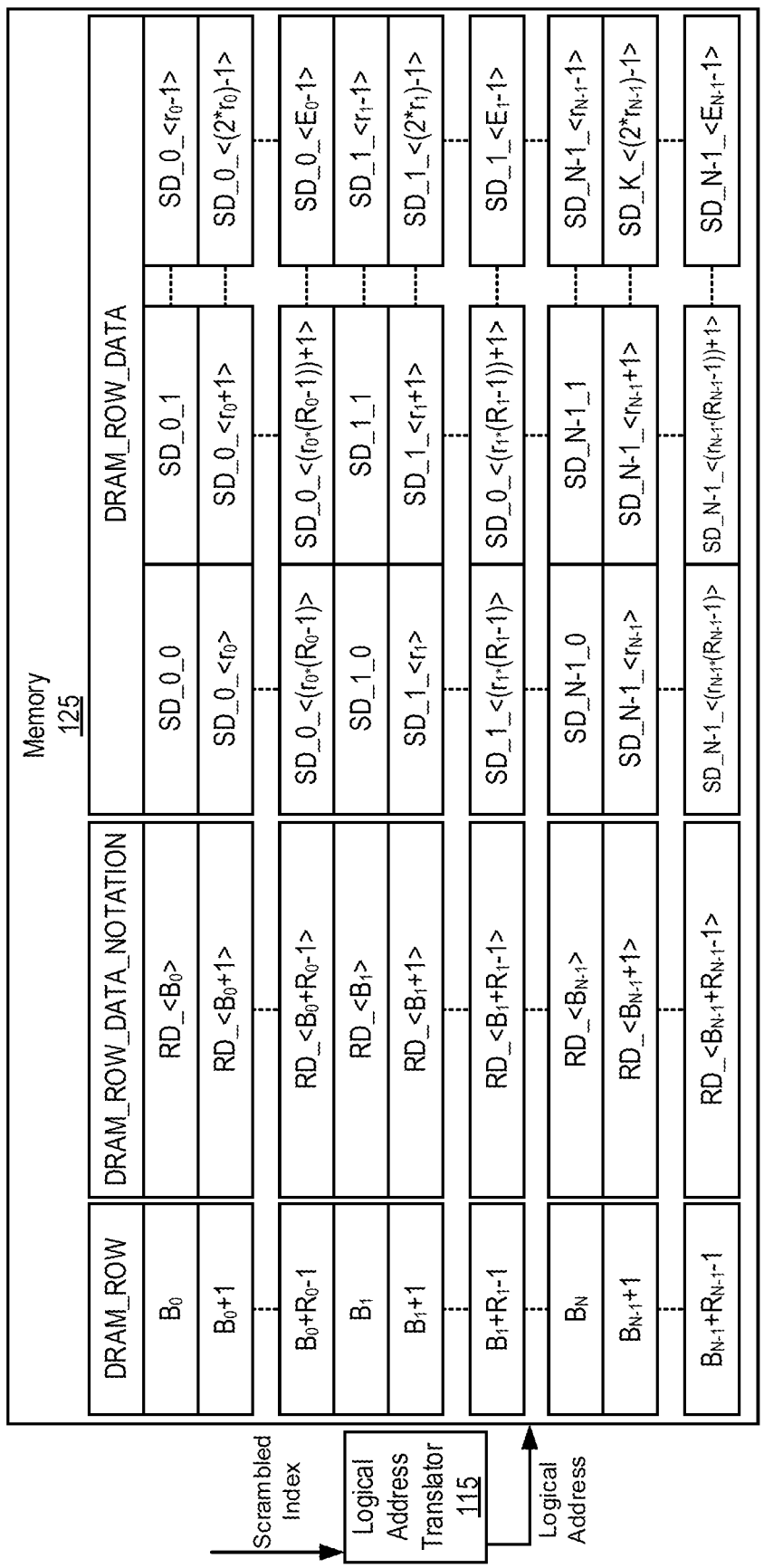
FIG. 3B is a block diagram of a memory mapping for a table, according to some embodiments.

FIG. 3B is a block diagram of a memory mapping, according to some embodiments. The memory mapping can be for the memory 125 prior to the global row scrambler 120 scrambling the plurality of addresses. The plurality of scrambled entry indexes associated with the lookup table 301 can be provided to the logical address translator 115. FIG. 3B depicts the plurality of scrambled entry indexes as scrambled index. The logical address translator 115 can translate the plurality of scrambled entry indexes to a plurality of logical DRAM addresses. The logical DRAM addresses can map to rows within memory 125. For example, a first scrambled entry index of the lookup table 301 can map to a first row within memory 125. Additionally, a first scrambled entry index, and a second scrambled entry index can map to and/or fit in a first row within memory 125. Some equations are provided below:

$E_k$ = Number of entries in table $k$ $r_k$ = Number of entries, in table $k$, that fit in a single DRAM row – no table entry can span across DRAM rows $$r_k = \left\lceil \frac{DRAM \text{ Row width in bits}}{\text{Width of Table } k \text{ entry in bits}} \right\rceil$$

$R_k$ = Number of DRAM rows that can store table $k$ $B_k$ = Base DRAM row address for the table $k$ $B_0 = 0$ $$B_i = \sum_{j=0}^{j=i-1} R_j; \; 1 \le i \le (k-1)$$

SD_<i>_<j> = Data for scrambled entry index $j$ of lookup table $i$

RD_<i> = contents of DRAM row $i$

In some embodiments, the equations above can be used to determine which entries and/or how many entries are located within and/or fit in rows within DRAM. As a non-limiting example, $E_0=10$, $r_0=1$, $R_0=10$, $B_k=B_0$. As a result, in this non-limiting example, the contents of DRAM row 0 can be RD_<0>=SD_<0>_<0>. As an additional non-limiting example, $E_0=10$, $r_0=2$, $R_0=5$, $B_k=B_0$, and as a result the contents of DRAM row 0 can be SD<0><0>, and SD_<0>_<1> concatenated with each other without sharing a column. In some embodiments, table k can be or include the lookup table 301. The value of $E_k$ and/or $r_k$ can be used to determine the number of DRAM rows that can be used to store the entries of the lookup table 301 (e.g., $R_k$), in some embodiments. As a non-limiting example, $r_k$ can equal 2 and as a result $R_k$ can equal 25 as each DRAM row can hold two entries.

While FIG. 3B depicts each DRAM row including multiple entries, each DRAM row can hold, store, maintain or otherwise keep one and/or more entries. As a non-limiting example, $r_0$ can equal 3, and DRAM Row $B_0$ (e.g., row 0) can hold SD_0_0, SD_0_1, and SD_0_2 with SD_0_2=SD_0_<$r_0-1$>. As another non-limiting example, $r_0$ can equal 1, and DRAM Row $B_0$ (e.g., row 0) can hold SD_0_0, with SD_0_0=SD_0_<$r_0-1$>.

Figure 3C:
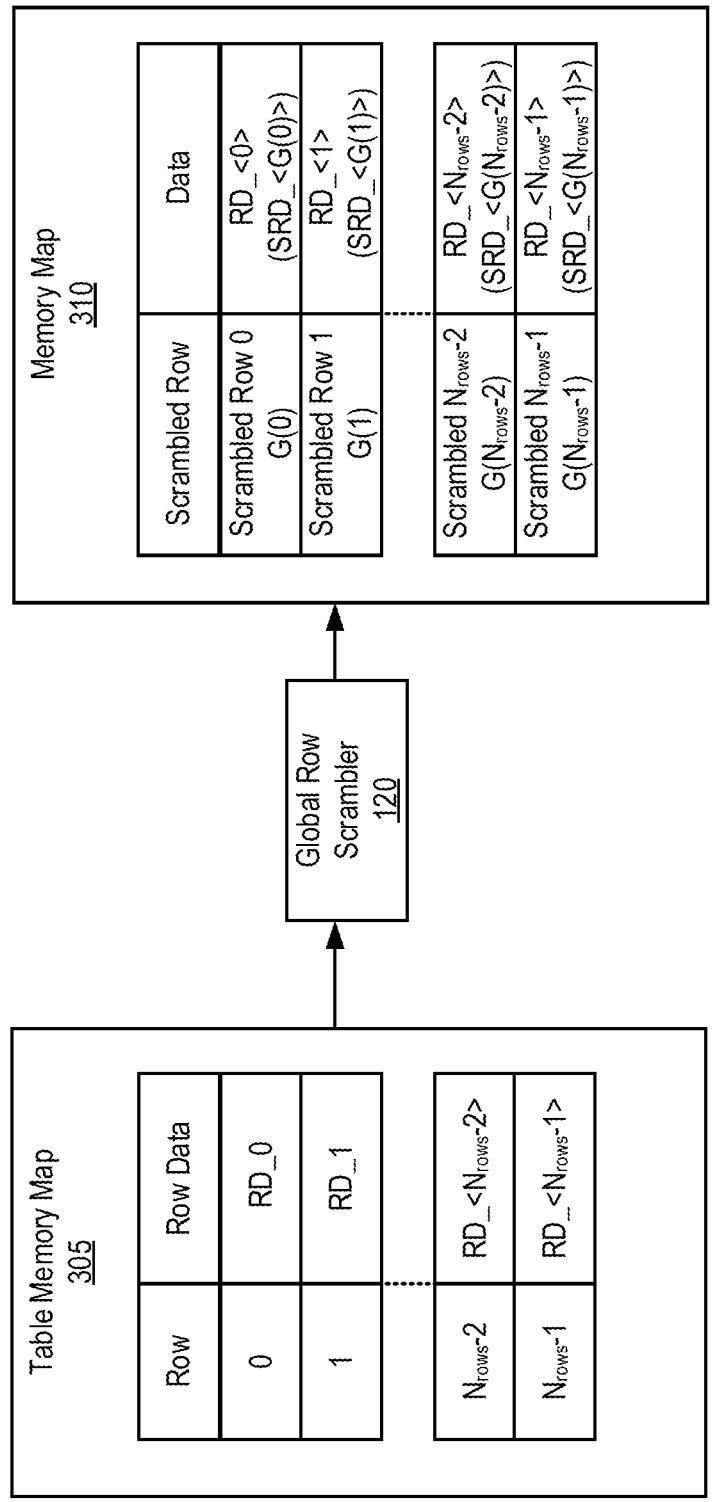
FIG. 3C is a block diagram of a memory mapping for a table, according to some embodiments.

FIG. 3C is a block diagram of a memory mapping, according to some embodiments. FIG. 3C depicts an example of the contents of a table memory map 305 being provided to the global row scrambler 120 and an example of the global row scrambler 120 outputting the scrambled addresses to a memory map 310. The table memory map 305 can include the logical DRAM from FIG. 3B. Some equations are provided below:

$N_{rows}$ = number of DRAM rows in memory 125

RD_<i> = contents of DRAM row $i$ (e.g., pre-scrambling DRAM row)

SRD_<i> = contents of scrambled DRAM row $i$ $G(x)$ = scrambling function for the global row scrambler 120

$$SD\_<G(i)> = RD<i>$$

In some embodiments, the equations above can be used to determine where the entry indexes and/or the entries, corresponding to the entry indexes, stored in the lookup table 301 have been globally scrambled by the global row scrambler 120. As a non-limiting example, G(4)=1, and as a result SRD_G(4)=SRD_1=RD_4. In this non-limiting example, the contents of physical DRAM row 1 (e.g., SRD_1) within DRAM would be the data that corresponds to the contents of RD_4 (e.g., logical DRAM row 4 address).

In some embodiments, the equations and the techniques described above can also be used to determine the entry indexes and/or entries that corresponds to a DRAM row. As a non-limiting example, SRD_4=RD_<G(4)>. The scrambling function for the global row scrambler 120 can be used to determine the DRAM row that was scrambled to SRD_4. In this non-limiting example, G(17)=4, and SRD_4=RD_17, meaning that the contents of DRAM row 17 were scrambled to DRAM row 4. To continue this non-limiting example, the scrambling function of the entry scrambler, that scrambled the lookup table corresponding to the entry located in RD_17, can be used to determine which entries were scrambled to DRAM row 17, by the entry scrambler. In this non-limiting example RD_17 can store SD_0_17, and SD_0_17=D 0<22> given that $S_k(22)=17$. In this non-limiting example, the entry that originally corresponded to entry index 22 was scrambled from entry index 22 to entry index 17, and then the entry was scrambled from DRAM row 17 to DRAM row 4.

Figure 4A:
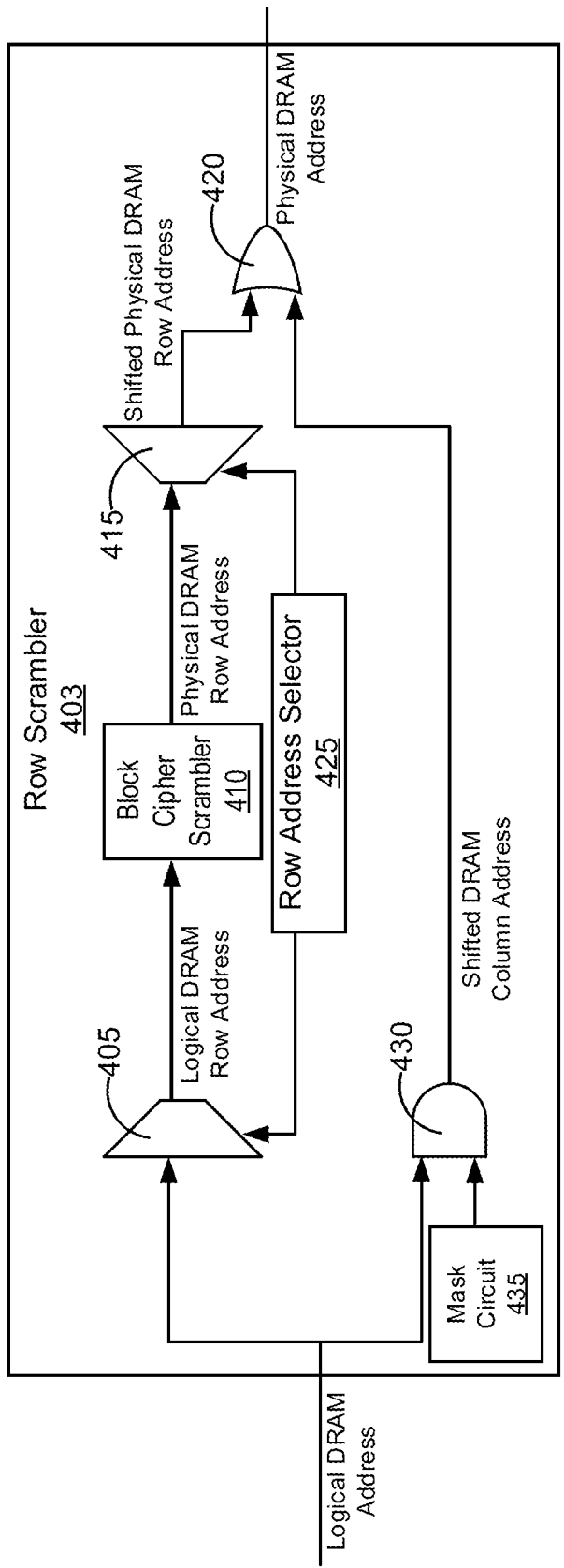
FIG. 4A is a schematic block diagram of a row scrambler, according to some embodiments.

FIG. 4A is a schematic block diagram of a row scrambler 403, according to some embodiments. The row scrambler 403 can be and/or include at least one of the row scramblers 265, 270 and/or 275. The row scrambler 403, and/or a component thereof can include at least one multiplexer array 405, at least one block cipher scrambler 410, at least one demultiplexer array 415, at least one OR gate array 420, at least one row address selector 425, at least one AND gate array 430, and at least one mask configuration register 435 and/or a mask circuit (e.g., Mask C) 435. In some embodiments, the local scrambler 110, and/or a component thereof can include similar components to that of the components depicted in FIG. 4A. For example, the local scrambler 110 can include the block cipher scrambler 410. The row scrambler 403 can receive a number of logical DRAM addresses (e.g., the first value of the addresses within memory 125). The logical DRAM addresses can be provided to the multiplexer array 405 and the AND gate array 430. The multiplexer array 405 can be used to select bits of the logical DRAM address pertaining to the logical DRAM row address, and then can pass the bits in the form of a packed bit vector to the block cipher scrambler 410. The AND gate array 430 can be used to zero-out or mask all bits of the DRAM address not pertaining to the DRAM column address, and pass what is essentially a shifted column address (e.g., a bit vector of the same width as the logical DRAM address) with the bits pertaining to the column address being equal to the corresponding bits in the logical DRAM address, and all other bits set to 0. In some embodiments, the row address selector 425 can be or include a configuration register that includes predetermined values that are based on DRAM connections and/or addressing scheme (e.g., address design, address configuration or address numbering).

The mask circuit 435 can be or include a configuration register that provide a mask to can mask out (e.g., exclude, ignore or disregard) all bits other than the column bits in the logical DRAM address. For example, a first address can include 20 bits (bits 0, 1, 2 . . . 17, 18 and 19). In some embodiments at least one bit included in the address can correspond to a column address and at least one bit can correspond to a row address. For example, bits 0-4 and 8-19 can correspond to the row address, and bits 5-7 can correspond to the column address. In this example, the mask circuit 435 can be a configuration register that provides a bit vector with each of bits 0-4 and 8-19 set to 0 and each of bits 5-7 set to 1. Furthermore, in this example, the row address selector 425 can be a configuration register the provides the appropriate select inputs to multiplexer array 405 to select bits 0-4 and 8-19 from the logical DRAM address to extract the logical DRAM row address.

The block cipher scrambler 410 may refer to and/or include circuitry and/or hardware similar to that of the address circuit 102 and/or a component thereof. Similarly, the block cipher scrambler 410 may be stored as instructions and when the instructions are executed by a processor results in the processor performing functionality similar to the block cipher scrambler 410. The block cipher scrambler 410 can receive the logical DRAM row addresses. The block cipher scrambler 410 can be or include a scrambling technique. The block cipher scrambler 410 can scramble the logical DRAM row addresses to calculate a physical DRAM row address. The scrambling method can be or include format preserving encryption. The block cipher scrambler 410 can be configured by at least one of a set of cipher keys, a set of encryption keys or a set of stage keys. For example, a logical DRAM row address can be a 13 bit address, which the block cipher scrambler 410 can then scramble into another valid 13 bit address. The demultiplexer array 415 can receive the physical DRAM row addresses and a configuration from the row address selector 425. The demultiplexer array 415 reverses the action of multiplexer array 405 to create a shifted physical DRAM row address. This shifted physical DRAM row address is a bit vector of the same width as the logical DRAM address, with the bits pertaining to the logical DRAM row address being equal to the corresponding bits in the physical DRAM row address, and all other bits (which can pertain to the column address) being set to 0. The demultiplexer array 415 can pass a shifted physical DRAM row address to the OR gate array 420. The OR gate array then performs a Boolean OR operation on the shifted physical DRAM row address and the shifted DRAM column address to obtain a physical DRAM address. The physical DRAM address can be passed to Memory 125.

Figure 4B:
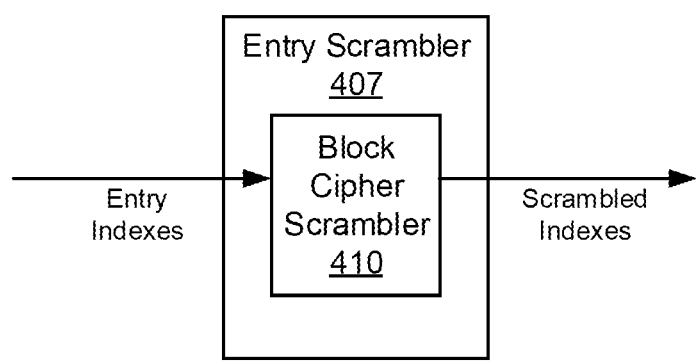
FIG. 4B is a schematic block diagram of an entry scrambler, according to some embodiments.

FIG. 4B is a schematic block diagram of an entry scrambler 407, according to some embodiments. The entry scrambler 407 can be and/or include at least one of the entry scramblers 220, 225 and/or 230. The entry scrambler 407 and/or a component there of can include the block cipher scrambler 410. The block cipher scrambler 410 can receive the plurality of entry indexes and the block cipher scrambler 410 can scramble the entry indexes from a plurality of first values to a plurality of second values.

Figure 5:
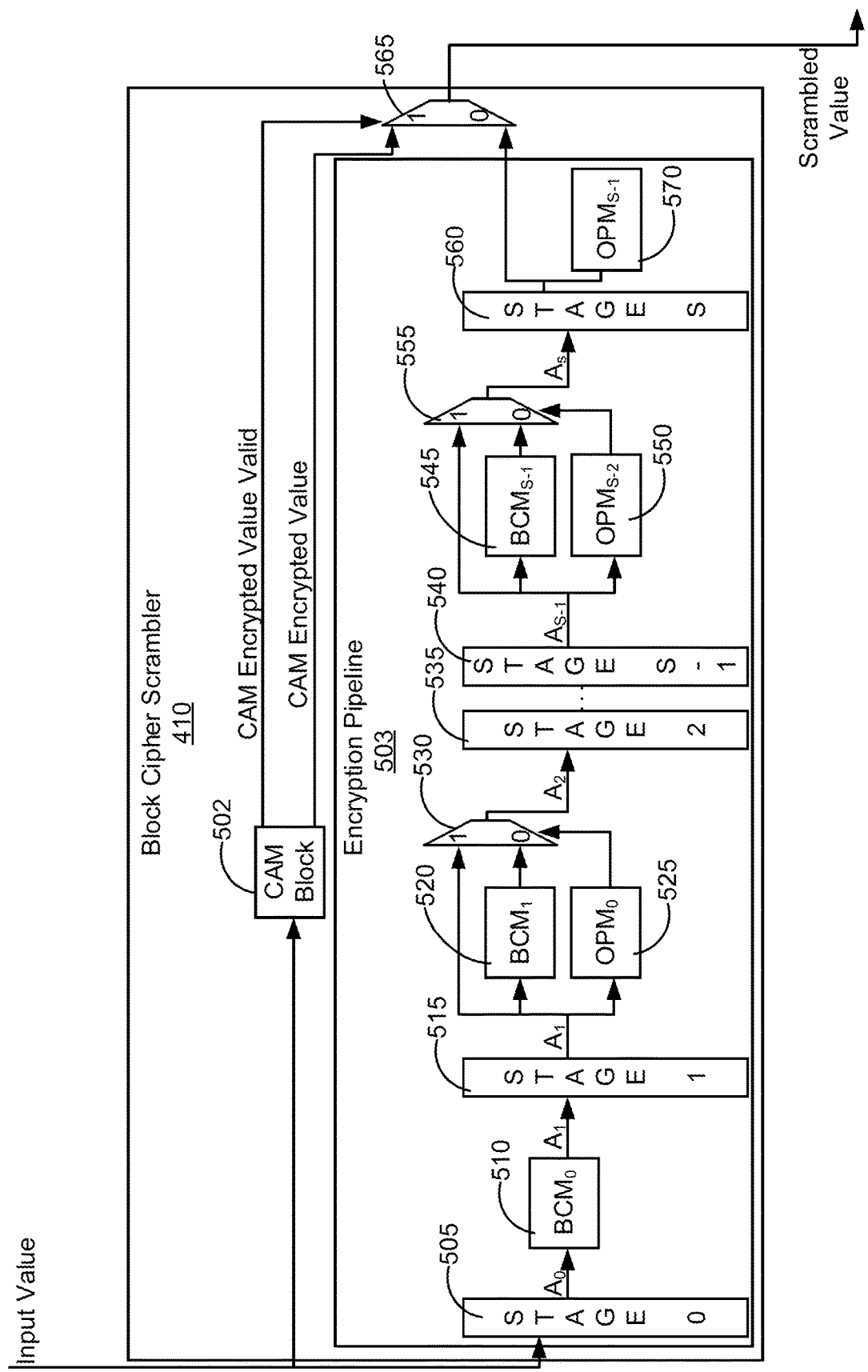
FIG. 5 is a schematic block diagram of a block cipher scrambler, according to some embodiments.

FIG. 5 is a schematic block diagram of the block cipher scrambler 410. The block cipher scrambler 410 can include at least one Outlier Mapping Content Addressable Memory Block (CAM Block) 502 and at least one encryption pipeline 503. In some embodiments, the CAM Block 502 can be or include a mapping block, which in some embodiments may be implemented using one or more Content Addressable Memories (CAMs) paired with Policy Tables (SRAMs). The encryption pipeline 503 can be a pipelined circuit that performs, using format preserving encryption, a number of cycle walks implemented as a number of pipeline stages (e.g., stages 505, 515, 535, 540 and 560). The Encryption pipeline 503 can perform format preserving encryption using the process of cycle walking. The encryption pipeline 503 can receive an input value that is an n-bit value, and not all $2^n$ possible combinations of bits are legal, the encryption pipeline repeatedly encrypts the input value using a block cipher module (BCM) and checks the legality of the encrypted value using an Output Processing Module (OPM) until a legal value is obtained. In some embodiments, the number of cycle walks to encrypt all inputs values to legal values can be greater than the number of pipeline stages included in the encryption pipeline 503.

In some embodiments, the legal input values (e.g., values that cannot be scrambled by the encryption pipeline 503) can be directly mapped using the CAM Block 502. The CAM block 502 can produce two outputs (e.g., CAM Encrypted Value Valid and CAM Encrypted Value). The CAM Encrypted Value Valid output indicates that the input value was one of the values that can be encrypted using the CAM block 502, and the CAM Encrypted Value output is the actual scrambled value corresponding to the input value. The multiplexer array 565 can select between the outputs of the CAM Block 502 and the encryption pipeline 503 to obtain the scrambled value, which is the output of the Block Cipher Scrambler 410. The latency in terms of the number of clock cycles of the encryption pipeline 503 and the CAM Block 502 can be the same, in some embodiments. The latency being the same between the encryption pipeline 503 and the CAM block 502 can maintain coherence between the two data paths. The scrambled value can be a scrambled entry index passed to the Logical Address Translator 115 or a logical DRAM address passed to the global row scrambler 120.

The block cipher scrambler 410 can include a plurality of block ciphers and/or block cipher modules (BCM), according to some embodiments. In some embodiments, the CAM block 502 can be or include a mapping block. The mapping block may refer to circuitry similar to at least one of the block cipher scrambler 410, the address circuit 102, the local scrambler 110, the logical address translator 115 and/or the global row scrambler 120. In some embodiments, the block cipher scrambler 410 can be included in the local scrambler 110 and/or the global row scrambler 120. In some embodiments, the entry scramblers, of the local scrambler 110, and/or the row scramblers, of the global row scrambler 120, can include the same block cipher scrambler 410. In some embodiments, each entry scrambler, of the local scrambler 110, and/or each row scrambler, of the global row scrambler 120, can include a different block cipher scrambler 410. The block cipher scrambler 410 can perform, using format preserving encryption, a number of cycle walks and/or a number of pipeline stages. The cycle walks and/or the pipeline stages can be included in an encryption pipeline (e.g., the encryption pipeline 503).

The pipeline stages can be implemented to reach a legal address and/or legal value. In some embodiments, some input addresses and/or input values provided to the block cipher scrambler 410 cannot reach legal address and/or legal values from the pipeline stages. These input addresses can be handled by the CAM block 502. The input value can be passed to stage 0 of the Encryption Pipeline 503. Stage 0 is indicated with reference number 505. Stage 0 can pass the input value to a block cipher module (BCM) 510 (e.g., a block cipher included in the block cipher scrambler 410). The BCM 510 can receive the value and encrypt the value. The encrypted value generated by the BCM 510 is passed to stage 1. Stage 1 is indicated with reference number 515. The encrypted value generated by the BCM 510 can fall within the set of legal values or within the set of illegal values. The encrypted value generated by the BCM 510 can be passed to the BCM 520 and an Output Processing Module (OPM) 525. The OPM 525 can determine the legality (e.g., whether the encrypted value is legal or illegal) of the value generated by the BCM 510 and pass a signal to the select input of multiplexer 530 indicating the same. For example, the OPM 525 can pass a 0 for an illegal value, and a 1 for a legal. The select multiplexer 530 can pass, responsive to receiving a signal that the address is valid, the output of BCM 510 or the output of BCM 520 to stage 2. Therefore, the encrypted value produced by BCM 520 can be passed to stage 2 of the Encryption Pipeline 503, or discarded based on whether or not the OPM 525 indicates a legal value for the encrypted value produced by the BCM 520. The process in stage 1, can then be repeated for all remaining pipeline stages of the Encryption Pipeline 503 except the last stage which does not contain a BCM, but only has an OPM (e.g., OPM 570). The OPM 570 is used to flag an exception (due to incorrect configuration) in case the Encryption Pipeline indicates an illegal encrypted value in the last stage, and the input value is also not encrypted or scrambled by the CAM block 502. All stages in the encryption pipeline can use an identical block cipher configured with an identical set of keys (e.g., BCM 510, BCM 520 and BCM 545 can implement the same block cipher configured with exactly the same keys).

In some embodiments, the plurality of stages (e.g., stages 505, 515, 535, 540, and 560) and/or the CAM block 502 allows for the address circuit 102 to receive a second address and/or second entry while also encrypting the value of a first address. For example, stage 505 can pass the scrambled address to stage 515 and stage 505 can receive a new input address while providing the scrambled address to stage 515. The stages 505 and 515 can both scramble a different address in the same clock cycle. The stages 505 and 515 both scrambling addresses in the same clock cycle can increase the processing speed of the encryption pipeline as the scrambling of subsequent addresses can begin without waiting for the encryption pipeline to complete the scrambling of the previously received address.

In some embodiments, the number of stages (e.g., the stages of the encryption pipeline 503) included in the block cipher scrambler 410 and/or the address circuit 102 can be based on the number of entry indexes and the probability that a scrambled entry index address can be a valid address. For example, a DRAM can have 32 banks and each row address can be a $24b$ row address. The bank addresses can be mapped to 5 bits of the $24b$ DRAM row address. If 24 out of these 32 banks can be used, these 5 bits can have 24 legal values (e.g., 0 . . . 23). The remaining values are invalid and/or illegal values. The probability that the output of BCM 510 is an illegal address can be 25% and the probability that the output of BCM 510 is a legal address can be 75%. When the output of stage 0 is passed to stage 1, there can be a 75% probability that the output of BCM 510 was a legal address in the first place, and if not there can be a 75% probability that BCM 520 will scramble the incoming illegal address to a legal address. In this non-limiting example the probability of the output of stage 1 being a legal address can be 93.75% and the probability of the output of multiplexer 530 being an illegal address 6.25%. The above calculations can be repeated to calculate the probability of having an illegal address (e.g., an illegal value) at the output of each subsequent stage. For example, the encryption pipeline 503 can include 7 stages and the probability of finding an illegal address after 7 stages can be $0.25^7 = 0.0061\%$. This means that given a $24b$ row address, there can be approximately $0.25^7 * 0.75 * 2^{24} = 768$ legal input addresses that get scrambled to an illegal value. The exact number of addresses can depend on the encryption technique used and the set of encryption keys used. The addresses that are not scrambled to a legal value can be directly mapped to their scrambled address using the CAM Block 502.

As another non-limiting example, cycle walking can be used when the space of legal input values is not a power of 2. For example, an entry scrambler might be scrambling an input $12b$ entry index for a lookup table with 3K entries (e.g., 3072 entries). In this example, while 12 bits can represent values ranging from 0 to 4095, only values from 0 to 3071 are legal, and the remaining values are illegal.

In some embodiments, the number of legal values for the input value can equal the total number of possible values (e.g., the number of bits used to encode the input value). When the number of legal values is equal to the total number of possible values a scrambled value obtained after stage 0 of the encryption pipeline 503 can be a legal value. For example, if the input value was a 10b value, and the legal values ranged from 0 to 1023. In this example, each input value encrypted at stage 0 would be encrypted to a legal value.

Figure 6:
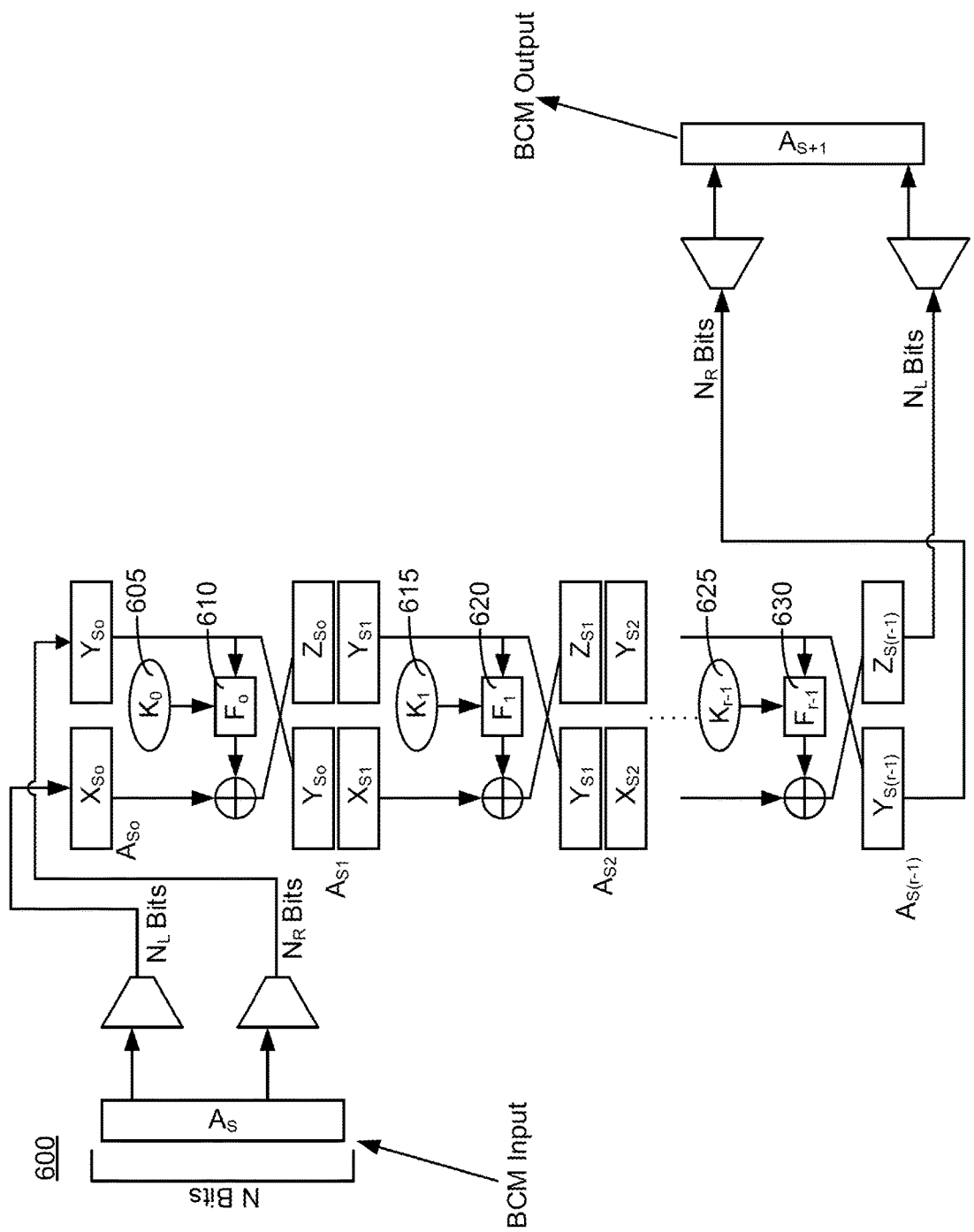
FIG. 6 is a schematic block diagram of a Feistel cipher, according to some embodiments.

FIG. 6 is a schematic block diagram of a Feistel cipher 600, according to some embodiments. The block cipher scrambler 410 can be or include the Feistel cipher 600. Similarly, the local scrambler 110 and/or the entry scramblers 220, 225, 230, the global row scrambler 120 and/or the row scrambler 265, 270, 275 can be and/or include the Feistel cipher 600. BCMS 510, 520, and/or 545 can be and/or include the Feistel cipher 600. The Feistel cipher 600 can have multiple rounds, each round can have its own rounding function and key. FIG. 6 shows the Feistel cipher 600 having "r" rounds, with each round having its own key (E.g., $K_0$, $K_1$, and $K_{r-1}$) and its own rounding function (e.g., $F_0$, $F_1$, and $F_{r-1}$). In some embodiments, the keys ($K_0$, $K_1$, and $K_{r-1}$)) can be the same key. In some embodiments, the keys ($K_0$, $K_1$, and $K_{r-1}$) can be different keys. $K_0$ is indicated with reference number 605. $K_1$ is indicated with reference number 615. $K_{r-1}$ is indicated with reference number 625. $F_0$ is indicated with reference number 610. $F_1$ is indicated with reference number 620. $F_{r-1}$ is indicated with reference number 630. The Feistel Cipher 600 may be an unbalanced Feistel Cipher if the bit width of the input value is not even. For example the circuit may implement the FFX mode of the Feistel Cipher 600.

Figure 7:
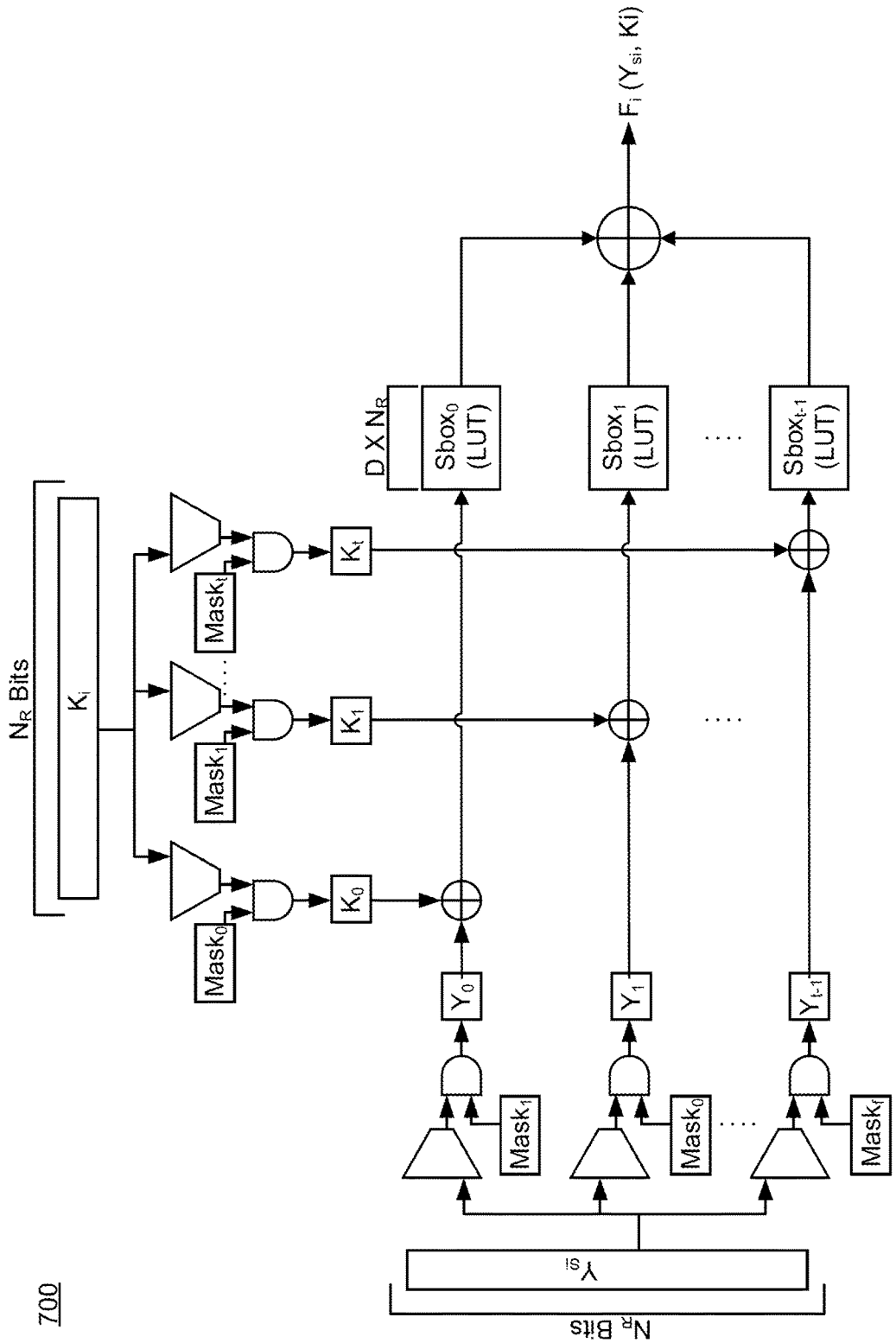
FIG. 7 is a schematic block diagram of a rounding function, according to some embodiments.

FIG. 7 is a schematic block diagram of a circuit used to implement a Feistel cipher rounding function 700 for use in the Feistel cipher 600, according to some embodiments. The block cipher scrambler 410 and/or a block cipher (e.g., BCMs 510, 520, and/or 545) can include the Feistel cipher rounding function 700. The Feistel cipher rounding function 700 can be at least one of the rounding functions (e.g., $F_0$, $F_1$, and $F_{r-1}$) depicted in FIG. 6. The Feistel cipher rounding function 700 can accepts one of the split pieces from the previous round as an input, along with the key for that round, and generates an output. FIG. 7 depicts an example of implementing a rounding function that includes extracting equal sized bit vectors from the split piece and the key using a combination of a multiplexer array and a masking circuit, XORing these values using an array of XOR gates, passing them as an index to asset Substitution Boxes (S-Boxes) implemented as programmable Lookup Tables (LUTs), and then XORing the result of these LUTs using an array of XOR gates.

Figure 8:
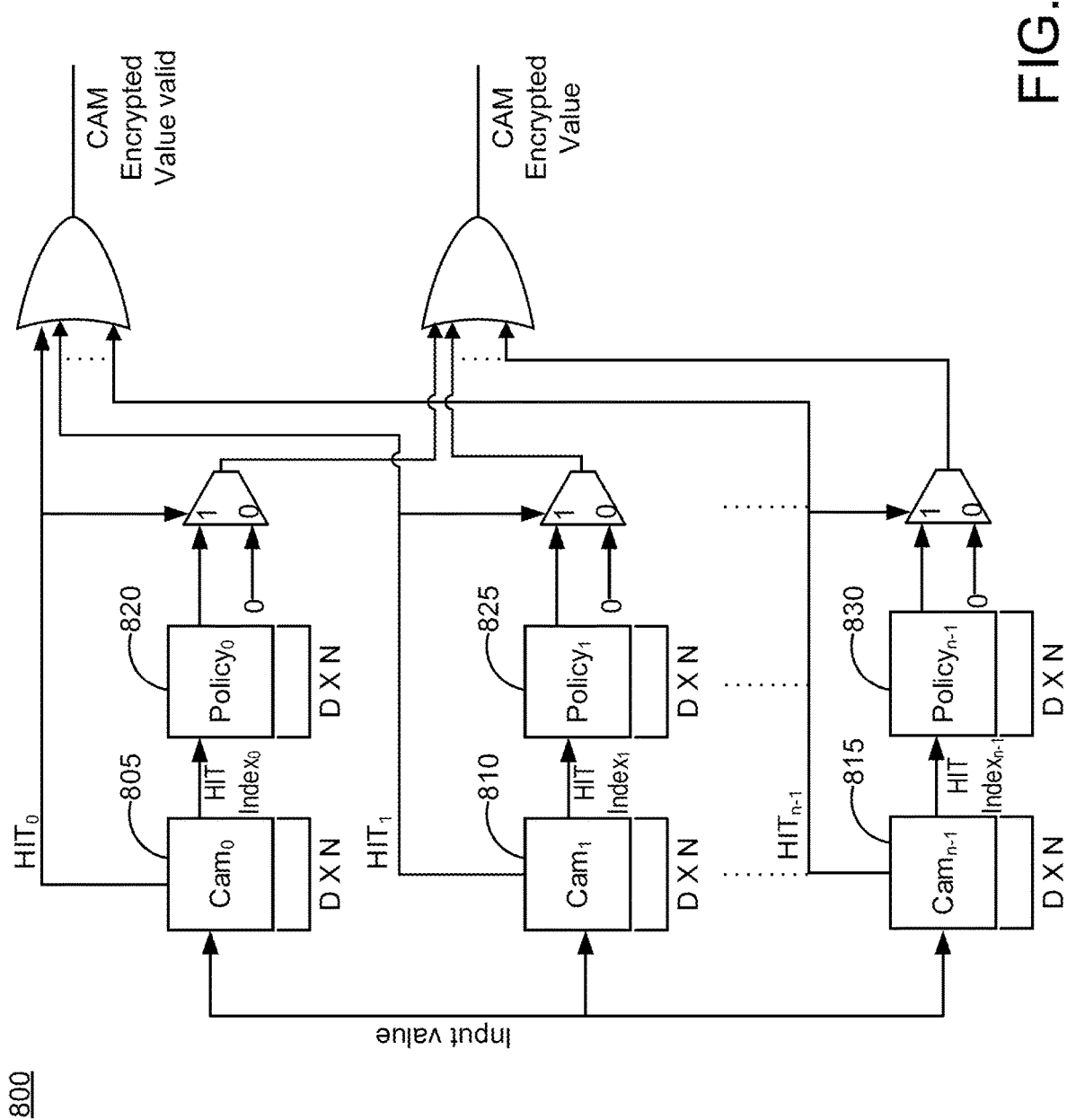
FIG. 8 is a schematic block diagram of a Content Addressable Memory (CAM) block, according to some embodiments.

FIG. 8 is a schematic block diagram of the CAM Block 502, according to some embodiments. In some embodiments, the CAM Block 502, can be implemented using a plurality of Content Addressable Memories (CAMs), each paired with a corresponding Policy Table (index based lookup table usually in SRAM). Each CAM (e.g., CAMs 805, 810, and 815) can receive a number of input values. The input values can be the entry indexes and/or the logical addresses described herein. Each CAM, when being looked up (e.g., input value was not scrambled to a legal value) can produce two outputs (e.g., a 1-bit HIT output indicating whether or not the input value is present in the CAM, and a HIT_INDEX indicating the index within the CAM where the input value is present). If the HIT output indicates that the input value is not present in the CAM, the HIT_INDEX will be invalid and/or 0. The HIT_INDEX output can be used as in index to the corresponding Policy Table, which is implemented as an index based lookup table typically implemented as a flop array, or in SRAM depending on the number of entries required. The SRAM contains the final scrambled value corresponding to the input value.

A HIT output from any CAM in the CAM Block (e.g., 805, 810 or 815) indicates that the input value is present within the CAM. The HIT outputs of all the CAMs can be ORed using an array of OR gates to produce the CAM Encrypted Value Valid output. The CAM Encrypted Value Valid output being set to 1 indicates that the input value cannot be scrambled by the encryption pipeline because of an insufficient number of pipeline stages, and can be scrambled directly using the CAM block. The HIT output also selects between the output of the Policy table, and a bit vector of the same width as the output of the policy table but having a value of 0, using a multiplexer. The outputs of the multiplexer are then bitwise ORed using an OR gate array to obtain the CAM Encrypted Value output. The CAM Encrypted Value output is only valid if the CAM Encrypted Value Valid output is valid. The CAM block's CAM Encrypted Value Valid is connected to multiplexer 565 as the select signal and the CAM Encrypted Value is connected to multiplexer 565 as the input for a select value of 1, with the output of the Encryption Pipeline being the other input to multiplexer 565 for a select value of 0.

As described herein, the block cipher scrambler 410 can be included in the local scrambler 110 and/or the global row scrambler 120. The entry indexes and/or the addresses can be provided and/or inputted into the block cipher scrambler 410 as input values. The block cipher scrambler 410 can scramble the inputs (e.g., the entry indexes and/or the addresses) to legal scrambled values. The block cipher scrambler 410 can scramble the inputs by performing stages included in an encryption pipeline. The number of stages can be implemented in hardware (e.g., the total number of stages is predetermined). The block cipher scrambler 410 can scramble the inputs using format preserving encryption. The format preserving encryption may be performed using cycle walking implemented as a combination of an Encryption Pipeline 503 and a CAM Block 502.

A number of the input addresses and/or a number of the input values may not be able to be scrambled, by the block cipher scrambler 410, to legal output values based on a number of stages in the Encryption Pipeline. These input values can then be added and/or included in a CAM (e.g., CAMs 805, 810 and/or 815), that is part of the CAM Block 800. The CAM can receive each input value. The CAM Block's CAM Encrypted Value Valid output indicates whether the input value is intended to be scrambled by the CAM Block, and can be subsequently used to select between the output of the CAM Block or the Encryption Pipeline to obtain the scrambled value output of the block cipher scrambler 410.

Figure 9:
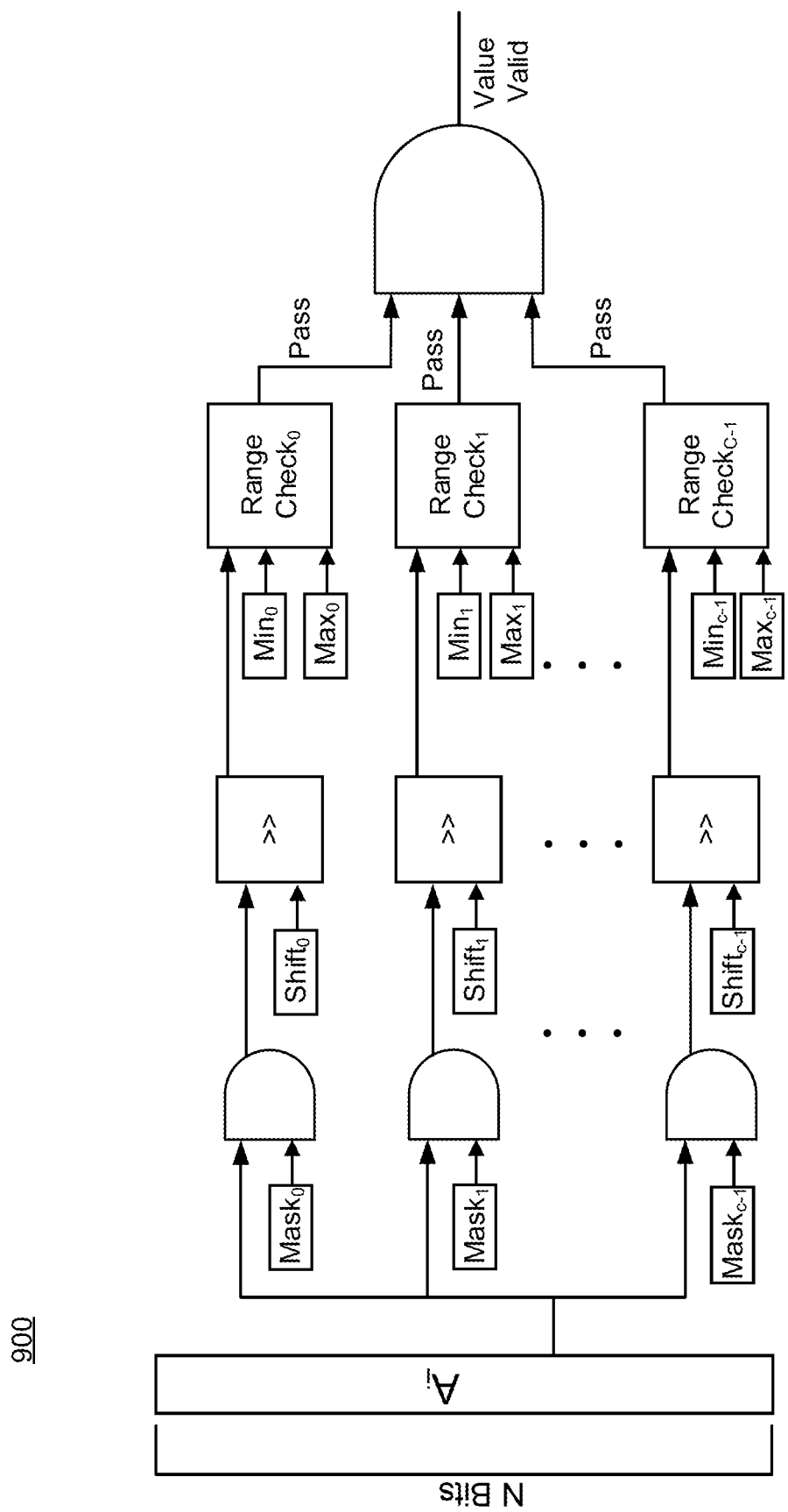
FIG. 9 is a schematic block diagram of an Output Processing Module (OPM), according to some embodiments.

FIG. 9 is a schematic block diagram of an Output Processing Module (OPM) 900, according to some embodiments. In some embodiments, the OPM 525, the OPM 550 and/or the OPM 570 can be or include the OPM 900. The local scrambler 110 and/or the global row scrambler 120 can include the OPM 900. The OPM 900 can determine the legality of a scrambled address (e.g., the legality of the second value of the entry index and/or the second value of the address within memory 125). The OPM 900 can be and/or include the logic circuit depicted in FIG. 9. The components of the logic circuit depicted in FIG. 9 can select parts of the input value (e.g., a certain bit or a number of bits) and compare the selected parts to a minimum and/or maximum range of values. If the range checks pass, the OPM 900 can determine that the input value was scrambled to a legal value. If the range checks fail, the OPM 900 can determine that input value was scrambled to an illegal value.

The local scrambler 110 (e.g., a first circuit) can include a plurality of pipeline stages (e.g., a number of stages included in an encryption pipeline 503 of the local scrambler 110 and/or a component thereof). The local scrambler 110 can implement the pipeline stages by performing cycle walks and/or steps similar to that of the encryption pipeline 503 with respect to stages 505, 515, 535, 540 and/or 560. For example, the local scrambler 100 can implement a first pipeline stage by performing a first cycle walk to change a first entry index from a first value to a second value, determining that the second value of the first entry index is an illegal value, and outputting the second value of the first entry index to a second pipeline stage of the plurality of pipeline stages. The first cycle walk may refer to the local scrambler 110 receiving the first value of the entry index and changing the entry index from the first value to the second value. For example, the block cipher scrambler 410 and/or the block cipher (e.g., BCM 510) included in the local scrambler 110 can receive, as an input, the first value of the first entry index at stage 0 (e.g., stage 505). The first value of the first entry index can be provided to the BCM 510 and the BCM 510 can change the first entry index from the first value to the second value. The local scrambler 110 can determine that the second value of the first entry index is an illegal value. For example, OPM 525 can determine that the second value is not a legal value. The local scrambler 110 can perform, responsive to determining that the second value is an illegal value, a second cycle walk to change the first entry index from the second value to a third value. The second cycle walk may refer to the local scrambler 110 advancing to a subsequent stage of the pipeline stages and changing the value of the entry index once again. For example, the BCM 520 can change the first entry index from the second value to the third value. The local scrambler 110 can repeat and/or perform subsequent cycle walks (e.g., perform the remaining stages included in the plurality of pipeline stages) to change the first entry index to a legal value. Subsequent cycle walks may refer to the local scrambler 110 completing the remaining stages within the plurality of pipeline stages. The local scrambler 110 can also use the cam block 502 and/or a mapping block (e.g., CAMs 805, 810, and/or 815) to determine that an input value cannot be scrambled by the plurality of pipeline stages to a legal output value.

The local scrambler 110 can determine that a second value of a first entry index is an illegal value. The illegal value may refer to values and/or addresses that can be scrambled to legal values and/or legal addresses. For example, the local scrambler 110 can include the OPM 525 and the OPM 525 can determine that the second value is illegal. The local scrambler 110 can determine that a pipeline stage cannot be performed to change the first entry index from the first value to a legal second value. The first value of the first entry index can be provided to a CAM and/or a mapping block included in the local scrambler 110 (e.g., CAM block 502, CAM 805, 810, and/or 815) and the CAM can determine and/or produce a HIT responsive to receiving the first value of the first entry index. The CAM can retrieve from a policy table (e.g., policy tables included in at least one of policy 820, 825 and/or 830) a predetermined output value (e.g., a predetermined valid value to change the first entry index to). The local scrambler 110 can change the first entry index from the first value to the predetermined value. The predetermined value may refer to a value located within the policy tables that corresponds to the valid input value that cannot be scrambled by the encryption pipeline.

The global row scrambler 120 (e.g., a third circuit) can include a second plurality of pipeline stages (e.g., a number of stages included in an encryption pipeline 503 of the global row scrambler 120 and/or a component thereof). The global row scrambler 120 can implement the second plurality of pipeline stages by performing cycle walks and/or steps similar to that of the encryption pipeline 503 with respect to stages 505, 515, 535, 540 and/or 560. For example, the global row scrambler 120 can implement a first pipeline stage by performing a first cycle walk to change a address within memory from a first value to a second value, determining that the second value of the address within memory is an illegal value, and outputting the second value of the address within memory to a second pipeline stage of the plurality of pipeline stages. The first cycle walk may refer to the global row scrambler 120 receiving the first value of the address within memory and changing the address within memory from the first value to the second value. For example, the block cipher scrambler 410 and/or the block cipher (e.g., BCM 510) included in the global row scrambler 120 can receive, as an input, the first value of address within memory at stage 0 (e.g., stage 505). The first value of the address within memory can be provided to the BCM 510 and the BCM 510 can change the address within memory from the first value to the second value. The global row scrambler 120 can determine that the second value of the address within memory is an illegal value. For example, OPM 525 can determine that the second value is not a legal value. The global row scrambler 120 can perform, responsive to determining that the second value is an illegal value, a second cycle walk to change the address within memory from the second value to a third value. The second cycle walk may refer to the global row scrambler 120 advancing to a subsequent stage of the pipeline stages and changing the value of the address within memory once again. For example, the BCM 520 can change the address within memory from the second value to the third value. The global row scrambler 120 can repeat and/or perform subsequent cycle walks (e.g., perform the remaining stages included in the plurality of pipeline stages) to change the address within memory to a legal value. Subsequent cycle walks may refer to the global row scrambler 120 completing the remaining stages within the plurality of pipeline stages. The global row scrambler 120 can also use the cam block 502 and/or a mapping block (e.g., CAMs 805, 810, and/or 815) to determine that an input value cannot be scrambled by the plurality of pipeline stages to a legal output value.

The first cycle walk, of the first pipeline stage of the plurality of pipeline stages, and a subsequent cycle walk, of a subsequent pipeline stage of the plurality of pipeline stages, can be performed in subsequent clock cycles. Subsequent clock cycles may refer to an amount of time and/or a process of executing an instruction and/or step described herein. For example, the local scrambler 110 can receive, at first clock cycle, the first value of the first entry index and the local scrambler 110 can change, at a second clock cycle, the first entry index from the first value to the second value and the local scrambler 110 can change, at a third clock cycle, the first entry index from the second value to the third value. The first cycle walk, of the first pipeline stage of the second plurality of pipeline stages, and a subsequent cycle walk, of a subsequent pipeline stage of the second plurality of pipeline stages, can be performed in subsequent clock cycles. Subsequent clock cycles may refer to an amount of time and/or a process of executing an instruction and/or step described herein. For example, the global row scrambler 120 can receive, at first clock cycle, the first value of the first address within memory and the global row scrambler 120 can change, at a second clock cycle, the first address within memory from the first value to the second value and the global row scrambler 120 can change, at a third clock cycle, the first address within memory from the second value to the third value.

Figure 10:
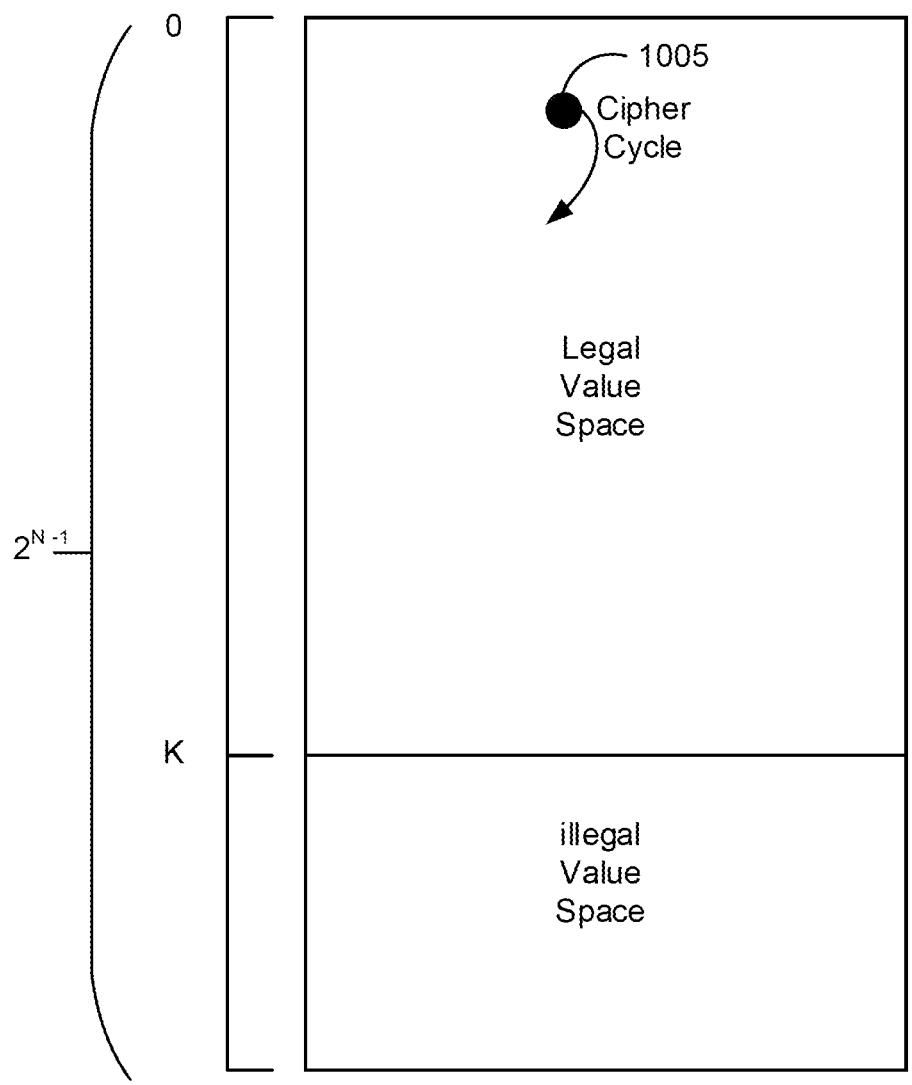
FIG. 10 is a block diagram of a single cipher walk operation, according to some embodiments.

FIG. 10 is a block diagram of a cipher walk and/or a cycle walk including a single cipher cycle 1005, according to some embodiments. The cipher cycle 1005 can be included in a pipeline stage. For example, the cipher cycle 1005 can be included in stage 505. The cipher cycle 1005 can be or include the scrambling of a value (e.g., an entry index and/or an address within memory). The cipher cycle 1005 shown in FIG. 10 depicts that the value was scrambled within the legal value space. Accordingly, given that the value fell within the legal value space a second cipher cycle can be omitted. In some embodiments, the address circuit 102 can perform the cipher cycle 1005.

Figure 11:
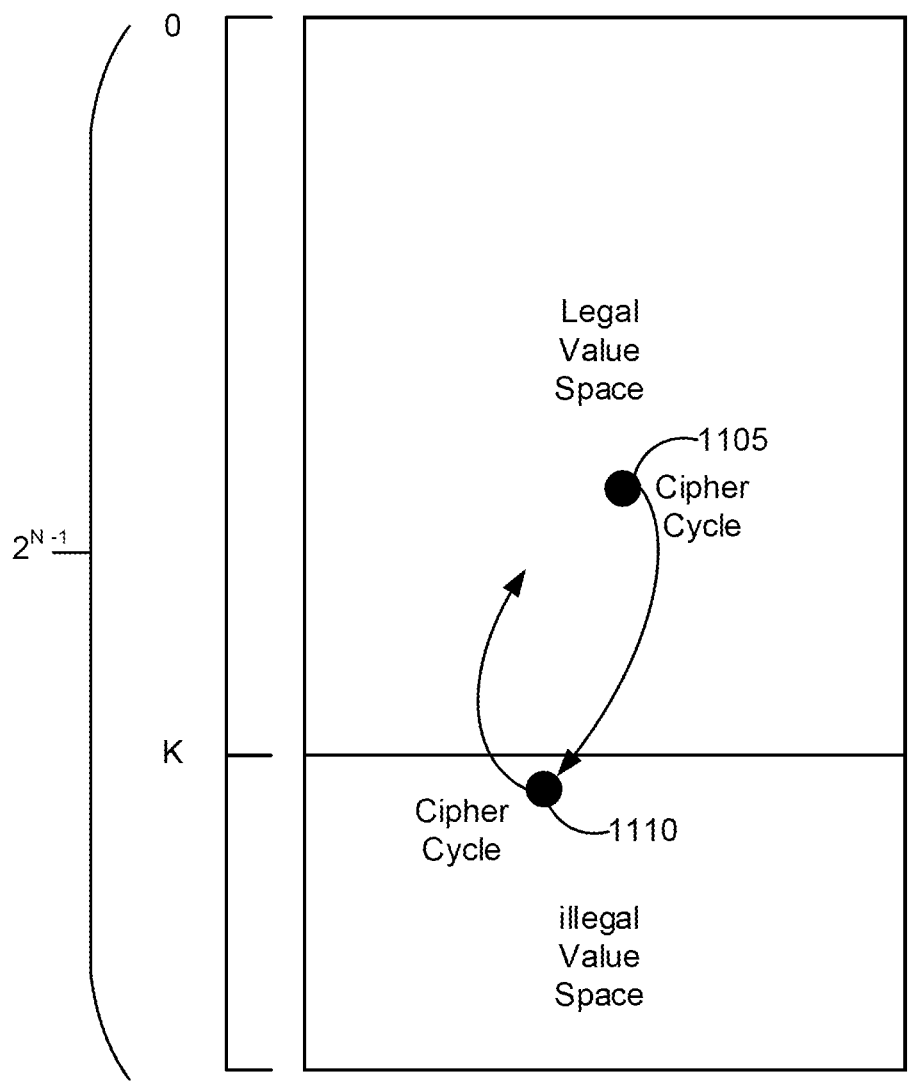
FIG. 11 is a block diagram of a double cipher walk operation, according to some embodiments.

FIG. 11 is a block diagram of a double cipher walk including a cipher cycle 1105 and a cipher cycle 1110, according to some embodiments. The cipher cycles 1105 and 1110 can be included in a plurality of pipeline stages. For example, the cipher cycle 1105 can be included in stage 505 and cipher cycle 1110 can be included in stage 515. The cipher cycles 1105 and 1110 can be or include the scrambling of a value (e.g., an entry index and/or an address within memory). The cipher cycle 1105 shown in FIG. 11 depicts that the value was scrambled to the illegal value space. Accordingly, the second cipher cycle 1110 was performed. The cipher cycle 1110 shown in FIG. 11 depicts that the value was scrambled within the legal value space. In some embodiments, the address circuit 102 can perform the cipher cycles 1105 and 1110.

Figure 12:
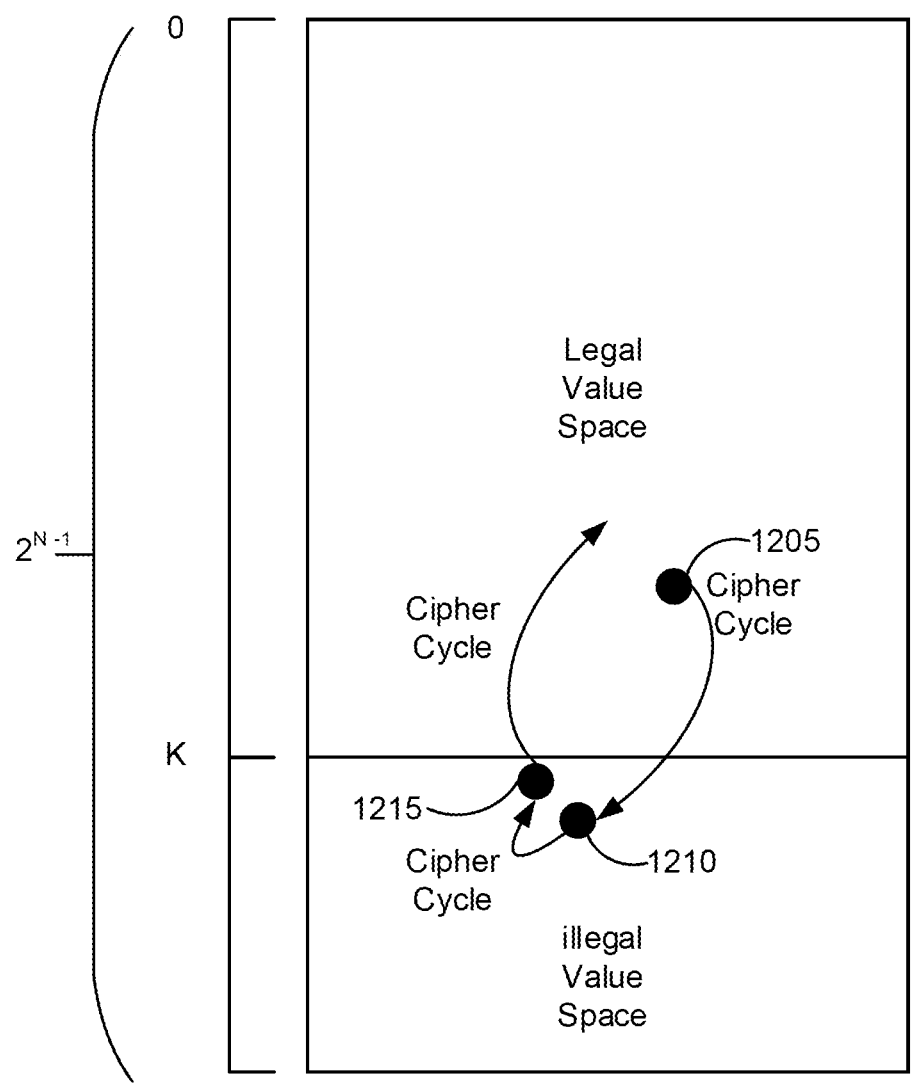
FIG. 12 is a block diagram of a triple cipher walk operation, according to some embodiments.

FIG. 12 is a block diagram of a triple cipher walk including a cipher cycle 1205, a cipher cycle 1210 and a cipher cycle 1215, according to some embodiments. The cipher cycles 1205, 1210, and 1215 can be included in a plurality of pipeline stages. For example, the cipher cycle 1205 can be included in stage 505, cipher cycle 1210 can be included in stage 515, and cipher cycle 1215 can be included in stage 535. The cipher cycles 1205, 1210, and 1215 can be or include the scrambling of a value (e.g., an entry index and/or an address within memory). The first cipher cycle 1205 shown in FIG. 12 depicts that the value was scrambled to the illegal value space. Accordingly, the second cipher cycle 1210 was performed. The second cipher cycle 1210 shown in FIG. 12 depicts that the value was scrambled to the illegal value space. Accordingly, the third cipher cycle 1215 was performed. The third cipher cycle 1215 shown in FIG. 12 depicts that the value was scrambled from the illegal value space to the legal value space. In some embodiments, the address circuit 102 can perform the cipher cycles 1205, 1210 and 1215.

In some embodiments, the bijectivity of the address circuit 102 and/or a component thereof (e.g., the block cipher scrambler 410) enables the cipher cycles described herein to avoid collisions (e.g., a first address and a second address are both scrambled to the same value). For example, a first address can be scrambled, by the address circuit 102, from a first value to a second value, and if the first address was scrambled repeatedly (e.g., at least once more) the first address would be returned (e.g., descrambled) to the first value prior to scrambling.

Figure 13:
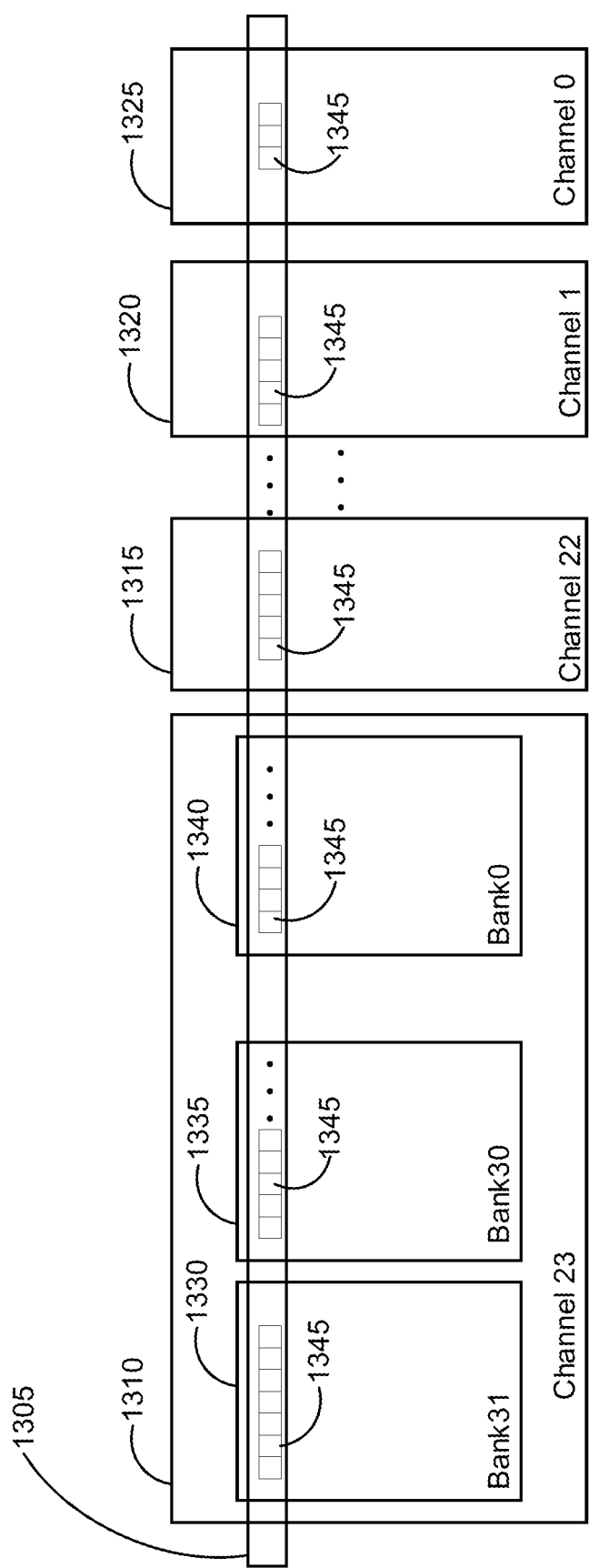
FIG. 13 is a block diagram of a number of channels, according to some embodiments.

FIG. 13 is a block diagram of a DRAM memory organized into number of channels and banks, according to some embodiments. In some embodiments, the number of channels can be or include the number of DRAM R/W interfaces. For example, a circuit that includes three channels indicates that the circuit includes three DRAM R/W interfaces. The channels are indicated with reference numbers 1310, 1315, 1320, and 1325. Each channel can include a number of banks (e.g., banks 1330, 1335, and 1340) and each bank can include a number of rows, and each row can include a number of columns. The rows that share a row number (e.g. row 1 from each of the banks 1330, 1335, and 1340) can be in a stripe 1305. The stripe 1305 can be the collection of all rows with the same row number. Each row can include a number of words and/or bits. The words or bits of a row are depicted with reference number 1345. A set of rows within a given channel of the stripe can be referred to as a PS-stripe. For example, the row (including bits 1345) shown in banks 1330, 1335, and 1340 can be a PS-stripe within the stripe 1305.

Figure 14:
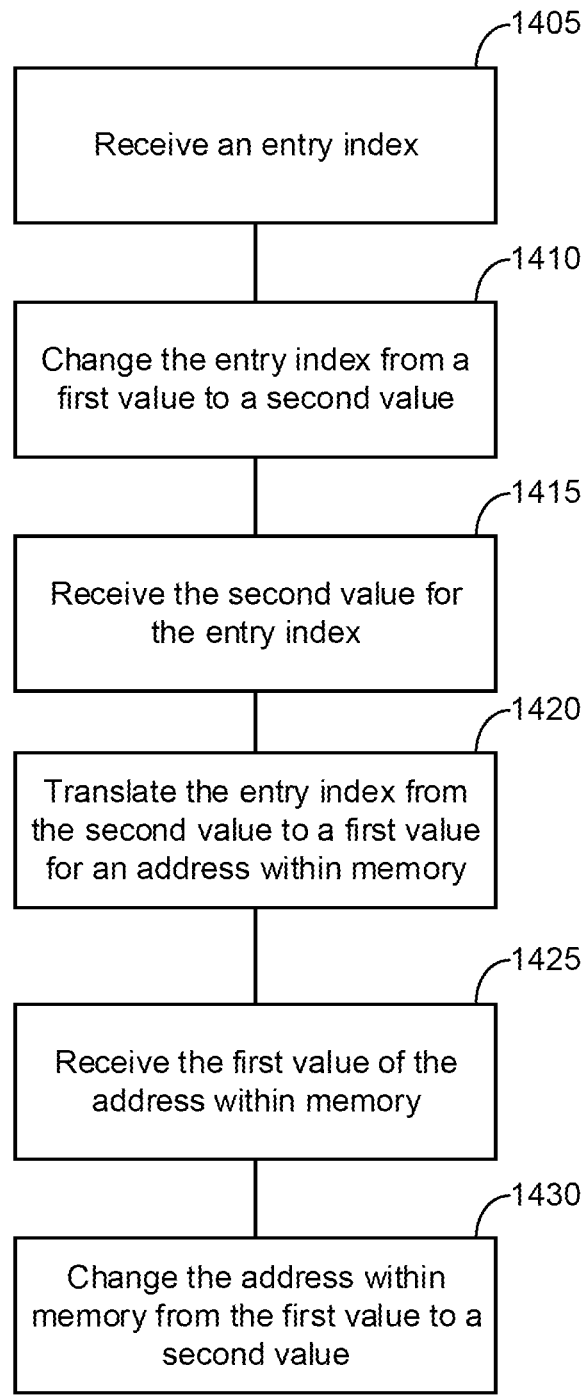
FIG. 14 is a flow diagram of a process of encryption of an entry index, according to some embodiments.

FIG. 14 is a flow diagram of a process 1400 of encryption of an entry index, according to some embodiments. In some embodiments, the system 100 and/or a component thereof can perform at least one step of the process 1400. For example, the local scrambler 110 can perform at least one step of the process 1400.

In step 1405, an entry index can be received. The entry index can be received from a packet processor. For example, the local scrambler 110 (e.g., a first circuit) can receive the entry index from the source 105. The entry index can correspond to an entry stored in a lookup table. For example, the entry index can correspond to an entry stored in the lookup table 301. The entry index can have a first value. The first value of the entry index can be, include, correspond to, map to and/or translate to a first entry stored within the lookup table. For example, the first value of the entry index can correspond to an entry associated with D_<k>_0 stored within the lookup table 301.

In step 1410, the entry index can be changed from the first value to the second value. For example, entry index received in step 1405, can be changed, by the local scrambler 110, from the first value to the second value. The second value for the entry index can be a scrambled entry index. The first value of the entry index can be a first entry stored within the lookup table 301, and the second value of the entry index can be an encrypted value of the first entry index. For example the first value can be D_<k>_0 and the second value can be SD_<k>_5. The local scrambler 110 can, responsive to changing the entry index from the first value to the second value, provide the second value for the entry index to the logical address translator 115.

In step 1415, the second value for the entry index can be received. For example, the logical address translator 115 (e.g., a second circuit) can receive the second value for the entry index from the local scrambler 110.

In step 1420, the entry index can be translated from the second value to a first value of an address within memory. For example, the logical address translator 115 can translate the first entry index (e.g., the second value) to a logical address (e.g., the first value of the address within memory), and the logical address can map to a physical address within memory 125. The first value of the address within memory 125 can be or include a logical address that maps to, corresponds to and/or is associated with a physical DRAM address. The logical address translator 115 can provide, to the global row scrambler 120, the first value of the address within memory 125.

In step 1425, the first value of the address within memory can be received. For example, the global row scrambler 120 (e.g., a third circuit) can receive the first value for the address within memory 125 from the logical address translator 115.

In step 1430, the first value of the address within memory can be change. For example, the global row scrambler 120 can change the address within memory 125 from the first value to the second value. The second value of the address within memory 125 can be a physical DRAM address. In some embodiments, the second value of the address within memory 125 can correspond to a physical DRAM address that is located in a different bank and/or region within DRAM. For example, the first value of the address within memory 125 can map to, correspond to, and/or be translated to a first physical address in a first bank within DRAM and the second value of the address within memory 125 can map to, correspond to and/or be translated to a first physical address in a second bank within DRAM.

In some embodiments, the process 1400 and/or a step thereof can be repeated with subsequent entry indexes associated with a plurality of lookup tables. For example, a second entry index can be used in the process 1400 to change the second entry index from a first value to a second value, and then translate the second value of the second entry index to a first value of a second address in memory, and then change the second address within memory from the first value to a second value. The second value of the first address within memory can be a physical DRAM address within a first DRAM database and/or bank and the second value of the second address within memory can be a physical DRAM address within a second DRAM database and/or bank.

The hardware system may be implemented in many different ways and in many different combinations of hardware and software and circuit designs. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLO), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. In some embodiments, the circuitry for calibration operations and the cells can be provided on one or more integrated circuit dies in an integrated circuit package. The integrated circuit package can be a combination of two or more packages in some embodiments.

The circuitry may further include or access instructions (e.g., software or firmware) for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HOD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system, comprising:
    memory configured to store a plurality of tables, each table of the plurality of tables having a plurality of entries, and each entry of the plurality of entries having a corresponding entry index;
    a lookup circuit, coupled with the memory, the lookup circuit configured to provide a plurality of entry indexes for each table of the plurality of tables to an address circuit; and
    the address circuit, comprising:
        a first circuit comprising:
            a plurality of entry scramblers, each entry scrambler of the plurality of entry scramblers having a scrambling technique; and
            a first entry scrambler of the plurality of entry scramblers configured to:
                receive, from the lookup circuit, a first entry index of a first table of the plurality of tables, the first entry index associated with a first entry of the first table; and
                change, using the scrambling technique of the first entry scrambler, the first entry index from a first value to a second value;
                the scrambling technique of the first entry scrambler comprises a cryptographic process of encryption to encrypt the first entry index;
        a second circuit including a plurality of translators;
            a first translator of the plurality of translators configured to:
                receive, from the first entry scrambler, the second value of the first entry index; and
                translate the second value of the first entry index to a first address within the memory, the first address within the memory corresponding to a first location of the first entry in the memory; and
        a third circuit comprising:
            a plurality of row scramblers, each row scrambler of the plurality of row scramblers having a scrambling technique configured in a first manner; and
            a first row scrambler of the plurality of row scramblers configured to:
                receive, from the first translator, the first address within the memory; and
                change, using the scrambling technique of the first row scrambler, the first address within the memory to a second address within the memory.

2. The system of claim 1, wherein:
    the first circuit comprises:
        a second entry scrambler of the plurality of entry scramblers configured to:
            receive, from the lookup circuit, a first entry index of a second table of the plurality of tables; and
            change, using the scrambling technique of the second entry scrambler, the first entry index of the second table of the plurality of tables from a first value to a second value;

the first table of the plurality of tables having a first width and a first depth;

the second table of the plurality of tables having a second width and a second depth; and at least one of the first width or the first depth is different than the second width or the second depth.

3. The system of claim 1, wherein:

the third circuit comprises:
- a second row scrambler of the plurality of row scramblers configured to:
  - receive, from a second translator of the second circuit, a third address within the memory; and
  - change, using the scrambling technique of the second row scrambler, the third address within the memory to a fourth address within the memory;
  - wherein the first location of the first entry corresponds to a first location within a first region of a plurality of regions of the memory;
  - wherein the second address within the memory corresponds to a first location within a second region of the plurality of regions of the memory;
  - wherein the third address within the memory, corresponds to a first location within a third region of the plurality of regions of the memory; and
  - wherein the fourth address within the memory corresponds to a second location within the third region of the plurality of regions of the memory.

4. The system of claim 1, wherein:

the first circuit including a plurality of pipeline stages, and the first circuit configured to implement a first pipeline stage of the plurality of pipeline stages by:
- performing a first cycle walk to change the first entry index from the first value to the second value;
- determining that the second value of the first entry index is an illegal value; and
- outputting the second value of the first entry index to a second pipeline stage of the plurality of pipeline stages;

the first circuit is configured to change the first entry index to a legal value by implementing subsequent pipeline stages of the plurality of pipeline stages or by using a first mapping block; and the third circuit including a second plurality of pipeline stages, and third circuit configured to implement a first pipeline stage of the second plurality of pipeline stages by:
- performing a first cycle walk to change the first address within the memory to the second address within the memory;
- determining that the second value of the address within the memory is an illegal value; and
- outputting the second address within the memory to a second pipeline stage of the second plurality of pipeline stages;

the third circuit configured to change the first address within the memory to a legal value by implementing subsequent pipeline stages of the second plurality of pipeline stages or by using a second mapping block;

the first cycle walk of the first pipeline stage of the plurality of pipeline stages and a subsequent cycle walk of a subsequent pipeline stage of the plurality of pipeline stages are performed in subsequent clock cycles;

the first cycle walk of the first pipeline stage of the second plurality of pipeline stages and a subsequent cycle walk of a subsequent pipeline stage of the second plurality of pipeline stages are performed in subsequent clock cycles.

5. The system of claim 4, wherein:

the first mapping block includes a plurality of content addressable memory paired with a plurality of policy tables;

the plurality of content addressable memory are configured to store a plurality of legal entry index values and the plurality of policy tables are configured to store a plurality of encrypted entry index values;

the second mapping block includes a second plurality of content addressable memory paired with a second plurality of policy tables; and the second plurality of content addressable memory are configured to store a plurality of legal address values and the second plurality of policy tables are configured to store a plurality of encrypted address values.

6. The system of claim 1, wherein:

the third circuit comprises:
- a second row scrambler of the plurality of row scramblers configured to:
  - receive, from a second translator of the second circuit, a third address within the memory; and
  - change, using the scrambling technique of the second row scrambler, the third address within the memory to a fourth address within memory.

7. The system of claim 1, wherein:

the scrambling technique of the first entry scrambler is the same as the scrambling technique of at least one additional entry scrambler of the plurality of entry scramblers;

the scrambling technique of the first entry scrambler is different than the scrambling technique of at least one second additional entry scrambler of the plurality of entry scramblers;

an encryption key of the scrambling technique of the first entry scrambler is different than an encryption key of the scrambling technique of the at least one additional entry scrambler of the plurality of entry scramblers; and the encryption key of the scrambling technique of the first entry scrambler is the same as an encryption key of the scrambling technique of the at least one second additional entry scrambler of the plurality of entry scramblers.

8. The system of claim 1, wherein:

the scrambling technique of the first entry scrambler comprises a block cipher; and the block cipher dictating the second value of the first entry index, and the block cipher dictating a second value of each additional entry index of the first table.

9. The system of claim 1, wherein:

the first circuit is configured to:
- determine that the second value of the first entry index is an invalid value;
- identify a predetermined value for the first entry index; and
- change the second value of the first entry index from the invalid value to the predetermined value.

10. An address circuit in communication with a lookup circuit, the lookup circuit coupled with memory and the memory configured to store a plurality of tables, each table of the plurality of tables having a plurality of entries, and each entry of the plurality of entries having a corresponding entry index, and the address circuit comprising:

a first circuit comprising:
- a plurality of entry scramblers, each entry scrambler of the plurality of entry scramblers having a scrambling technique; and
- a first entry scrambler of the plurality of entry scramblers configured to:
  - receive, from the lookup circuit, a first entry index of a first table of the plurality of tables, the first entry index associated with a first entry of the first table, and
  - change, using the scrambling technique of the first entry scrambler, the first entry index from a first value to a second value;
    - the scrambling technique of the first entry scrambler comprises a cryptographic process of encryption to encrypt the first entry index;

a second circuit including a plurality of translators;
- a first translator of the plurality of translators configured to:
  - receive, from the first entry scrambler, the second value of the first entry index; and
  - translate the second value of the first entry index to a first address within the memory, the first address within the memory corresponding to a first location of the first entry in the memory; and a third circuit comprising:
- a plurality of row scramblers, each row scrambler of the plurality of row scramblers having a scrambling technique configured in a first manner; and
- a first row scrambler of the plurality of row scramblers configured to:
  - receive, from the first translator, the first address within the memory; and
  - change, using the scrambling technique of the first row scrambler, the first address within the memory to a second address within the memory.

11. The address circuit of claim 10, wherein:
the first circuit comprises:
- a second entry scrambler of the plurality of entry scramblers configured to:
  - receive, from the lookup circuit, a first entry index of a second table of the plurality of tables; and
  - change, using the scrambling technique of the second entry scrambler, the first entry index of the second table of the plurality of tables from a first value to a second value;

the first table of the plurality of tables having a first width and a first depth;
the second table of the plurality of tables having a second width and a second depth; and
at least one of the first width or the first depth is different than the second width or the second depth.

12. The address circuit of claim 10, wherein:
the third circuit comprises:
- a second row scrambler of the plurality of row scramblers configured to:
  - receive, from a second translator of the second circuit, a third address within the memory; and
  - change, using the scrambling technique of the second row scrambler, the third address within the memory to a fourth address within the memory;
  - wherein the first location of the first entry corresponds to a first location within a first region of a plurality of regions of the memory;
  - wherein second address within the memory corresponds to a first location within a second region of the plurality of regions of the memory;
  - wherein the third address within the memory, corresponds to a first location within a third region of the plurality of regions of the memory; and
  - wherein fourth address within the memory corresponds to a second location within the third region of the plurality of regions of the memory.

13. The address circuit of claim 10, wherein:
the first circuit including a plurality of pipeline stages, and the first circuit configured to implement a first pipeline stage of the plurality of pipeline stages by:
- performing a first cycle walk to change the first entry index from the first value to the second value;
- determining that the second value of the first entry index is an illegal value; and
- outputting the second value of the first entry index to a second pipeline stage of the plurality of pipeline stages;

the first circuit is configured to change the first entry index to a legal value by implementing subsequent pipeline stages of the plurality of pipeline stages or by using a first mapping block; and the third circuit including a second plurality of pipeline stages, and third circuit configured to implement a first pipeline stage of the second plurality of pipeline stages by:
- performing a first cycle walk to change the first address within the memory to the second address within memory;
- determining that the second address within the memory is an illegal value; and
- outputting the second address within the memory to a second pipeline stage of the second plurality of pipeline stages;

the third circuit is configured to change the second address within the memory to a legal value by implementing subsequent pipeline stages of the second plurality of pipeline stages or by using a second mapping block;

the first cycle walk of the first pipeline stage of the plurality of pipeline stages and a subsequent cycle walk of a subsequent pipeline stage of the plurality of pipeline stages are performed in subsequent clock cycles;

the first cycle walk, of the first pipeline stage of the second plurality of pipeline stages, and a subsequent cycle walk, of a subsequent pipeline stage of the second plurality of pipeline stages, are performed in subsequent clock cycles.

14. The address circuit of claim 13, wherein:
the first mapping block includes a plurality of content addressable memory paired with a plurality of policy tables;
the plurality of content addressable memory is configured to store a plurality of legal entry index values and the plurality of policy tables are configured to store a plurality of encrypted entry index values;
the second mapping block includes a second plurality of content addressable memory paired with a second plurality of policy tables; and
the second plurality of content addressable memory is configured to store a plurality of legal address values and the second plurality of policy tables are configured to store a plurality of encrypted address values.

15. The address circuit of claim 10, wherein:
the scrambling technique of the first entry scrambler is the same as the scrambling technique of at least one additional entry scrambler of the plurality of entry scramblers;
the scrambling technique of the first entry scrambler is different than the scrambling technique of at least one second additional entry scrambler of the plurality of entry scramblers;
an encryption key of the scrambling technique of the first entry scrambler is different than an encryption key of the scrambling technique of the at least one additional entry scrambler of the plurality of entry scramblers; and
the encryption key of the scrambling technique of the first entry scrambler is the same as an encryption key of the scrambling technique of the at least one second additional entry scrambler of the plurality of entry scramblers.

16. The address circuit of claim 10, wherein:
the scrambling technique of the first entry scrambler comprises a block cipher; and
the block cipher dictating the second value of the first entry index, and the block cipher dictating a second value of each additional entry index of the first table.

17. A method of encryption of an entry index, the method comprising:
receiving, by a first circuit, the entry index, the entry index associated with an entry of table stored in memory;
changing, by an entry scrambler of the first circuit using a scrambling technique of the entry scrambler, the entry index from a first value to a second value;
receiving, by a second circuit, the second value of the entry index;
translating, by a translator of the second circuit, the second value of entry index a first address within the memory, the first address within the memory corresponding to a first location of the entry in the memory;
receiving, by a third circuit, the first address within the memory; and
changing, by a row scrambler of the third circuit using a scrambling technique of the row scrambler, the first address within the memory to a second address with the memory.

18. The method of claim 17, comprising:
receiving, by the first circuit, a second entry index; and
changing, by a second entry scrambler of the first circuit, the second entry index from a first value to a second value;
the entry index included in a first table of a plurality of tables, and the second entry index included in a second table of the plurality of tables;
the first table of the plurality of tables having a first width and a first depth;
the second table of the plurality of tables having a second width and a second depth; and
at least one of the first width or the first depth is different than the second width or the second depth.

* * * * *